United States Patent [19]

McAdam et al.

[11] Patent Number: 4,964,162

[45] Date of Patent: * Oct. 16, 1990

[54] SECURE TELEVISION SIGNAL ENCODING AND DECODING SYSTEM

[75] Inventors: Peter L. McAdam, Los Angeles; Thomas G. Schnerk, Rancho Palos Verdes; Gregory A. Shreve, Redondo Beach, all of Calif.

[73] Assignee: TRW Inc., Redondo Beach, Calif.

[*] Notice: The portion of the term of this patent subsequent to Dec. 8, 2004 has been disclaimed.

[21] Appl. No.: 933,668

[22] Filed: Nov. 21, 1986

Related U.S. Application Data

[63] Continuation-in-part of Ser. No. 773,488, Sep. 9, 1985, and a continuation-in-part of Ser. No. 831,941, Feb. 24, 1986, Pat. No. 4,827,510, and a continuation-in-part of Ser. No. 829,268, Feb. 14, 1986, abandoned, and a continuation-in-part of Ser. No. 878,735, Jun. 26, 1986, Pat. No. 4,712,240.

[51] Int. Cl.$^5$ .................... H04N 7/167; H04N 9/45; H04N 7/04
[52] U.S. Cl. .................. 380/14; 380/11; 380/17; 358/19; 358/144; 358/150; 375/18
[58] Field of Search ............ 380/11, 14, 171; 358/143-145, 19, 23, 148, 150, 153, 155; 375/18; 381/3

[56] References Cited

U.S. PATENT DOCUMENTS

| | | | |
|---|---|---|---|
| 3,723,637 | 3/1973 | Fujio et al. | 358/145 X |
| 3,916,092 | 10/1975 | Justice | 358/145 |
| 4,070,693 | 1/1978 | Shutterly | 380/11 |
| 4,114,710 | 9/1978 | Katoh et al. | 375/18 |
| 4,321,623 | 3/1982 | Rzeszewski | 358/145 X |
| 4,389,671 | 6/1983 | Posner et al. | 380/119 |
| 4,488,170 | 12/1984 | Nillesen | 358/148 |
| 4,488,176 | 12/1984 | Bond et al. | 358/141 |
| 4,491,862 | 1/1985 | Flamm | 358/19 |
| 4,517,586 | 5/1985 | Balaban et al. | 358/13 |
| 4,527,145 | 7/1985 | Haussmann et al. | 358/19 |
| 4,535,356 | 8/1985 | Nakagawa et al. | 358/145 |
| 4,556,900 | 12/1985 | Willis | 358/23 |
| 4,558,454 | 12/1985 | Hills et al. | 375/18 |
| 4,605,961 | 8/1986 | Frederiksen. | |
| 4,633,310 | 12/1986 | Gautier | 380/14 |
| 4,712,240 | 12/1987 | Schnerk | 375/18 X |

OTHER PUBLICATIONS

Baxes, Gregory A., "Digital Techniques Cure Line Segmentation Scrambling Problems," NCTA technical paper presented at Las Vegas Convention, Jun. 2-5, 1985, pp. 308-313.

Primary Examiner—Thomas H. Tarcza
Assistant Examiner—Linda J. Wallace
Attorney, Agent, or Firm—Sol L. Goldstein

[57] ABSTRACT

A television signal encoding and decoding system providing a line-spin scrambled video signal with substantially reduced amplitude gaps and line tilt and a digitally-encrypted audio signal that can be transmitted within the bandwidth limitations of a conventional NTSC television signal. The television signal encoding system, located at a television transmitter, includes a video and an audio encoder. The video encoder selectively line spin scrambles, reverses and inverts certain video lines or video line segments to generate a line-spin scrambled video signal having amplitude gaps less than some desired value. The audio encoder digitally encrypts the audio signal and modulates the encrypted audio signal with a three-level partial response waveform to generate and encrypted audio signal that can be transmitted within the bandwidth limitations of a conventional NTSC television signal. The television signal decoding system, located at a television receiver, includes a video and an audio decoder. The video decoder applies line tilt compensation to the received line-spin scrambled video signal and then unscrambles the compensated scrambled video signal. The audio decoder demodulates and decrypts the received audio signal.

88 Claims, 9 Drawing Sheets

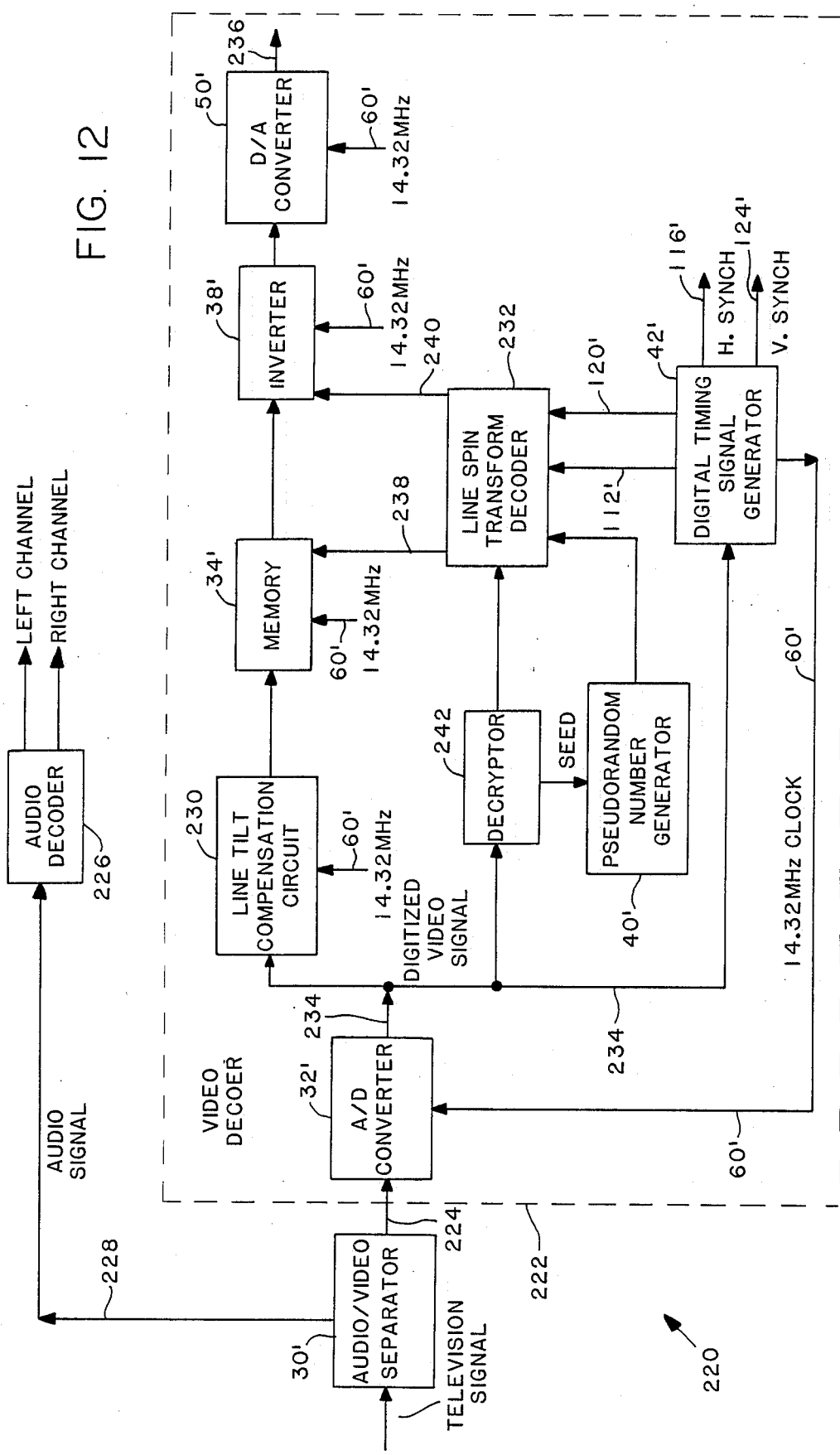

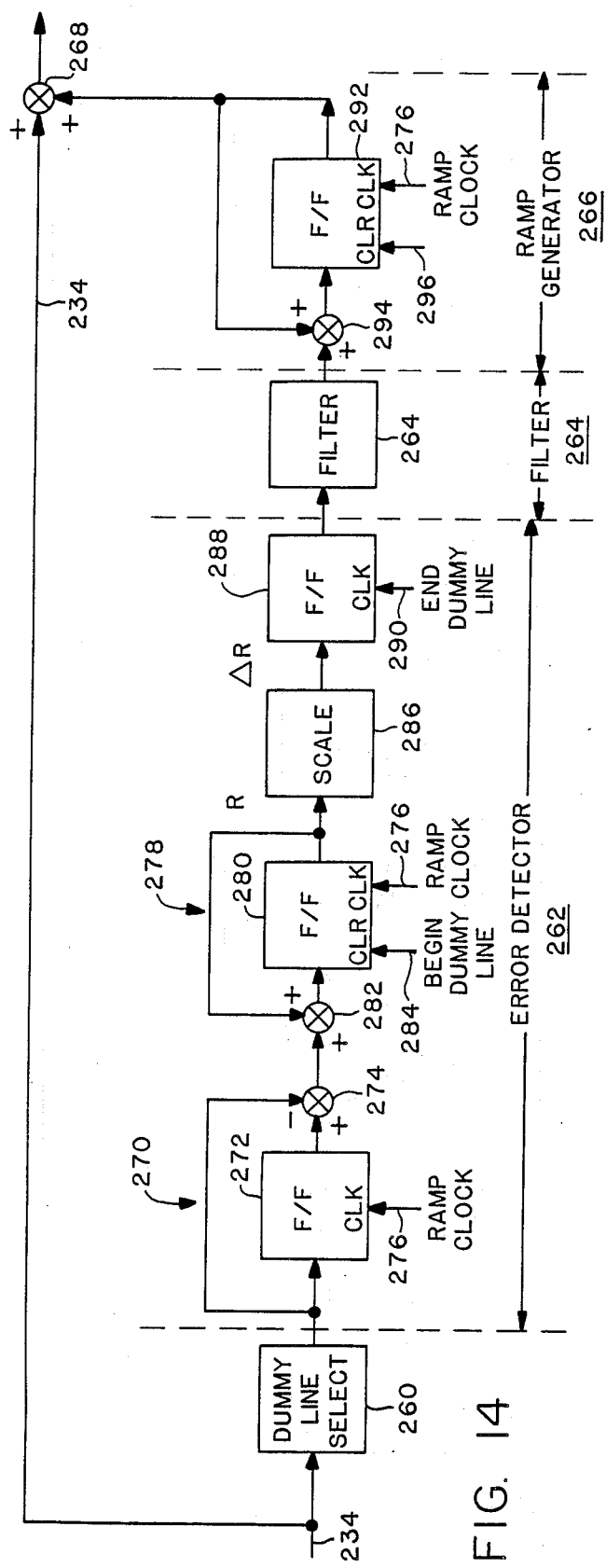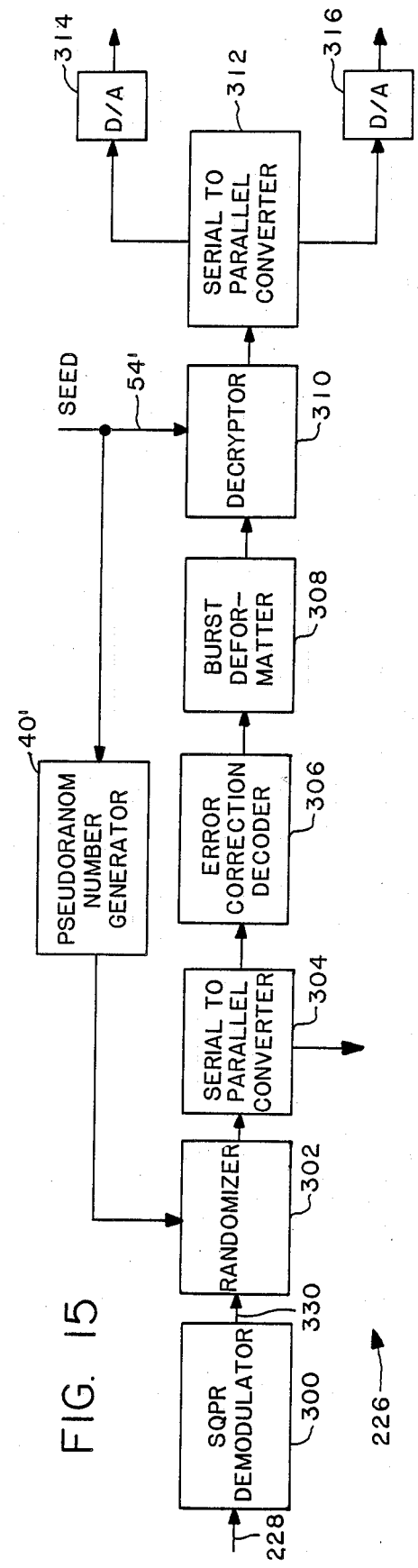

SECURE TELEVISION SIGNAL ENCODING AND DECODING SYSTEM

This application is a continuation-in-part of copending applications by one or more of the same inventors entitled "Line Tilt Compensation Method and Apparatus," Ser. No. 773,488, filed on Sept. 9, 1985, "Minimization of Amplitude Gaps in a Line-Spin Scrambled Signal," Ser. No. 831,941, filed on Feb. 24, 1986, now U.S. Pat. No. 4,827,510, Synchronization of Digital Processing Timing Signals with a Video Signal," Ser. No. 829,268, filed on Feb. 14, 1986, and subsequently abandoned and "Transmission and Reception of Television Broadcasts in High-Fidelity Stereo Audio," Ser. No. 878,735, filed on June 26, 1986, which issued as U.S. Pat. No. 4,712,240 on Dec. 8, 1987.

BACKGROUND OF THE INVENTION

This invention relates generally to television transmission and reception systems and, more particularly, to television signal encoding and decoding systems providing secure transmission and reception of both video and audio components of a television signal.

Secure transmission of television signals has become a matter of increasing importance with the growing popularity of video teleconferencing, cable TV and satellite TV transmissions, and with the advent of direct-broadcast-satellite (DBS) transmission. Various television signal encoding techniques have been developed that provide varying levels of security, with corresponding levels of complexity and cost. These range from relatively simple but easy to "break" sync-suppression techniques, which can be employed to protect the video component of a television signal, to relatively complex but difficult to "break" digital encryption techniques, which can be employed to protect both the video and audio components of a television signal. One video encoding technique that provides a relatively secure video signal, with a modest amount of complexity and cost, is line spin scrambling.

Line spin scrambling is performed in an encoder by segmenting the active portion of each video line at a breakpoint determined by a pseudorandom number generator. The two segments of each video line are then interchanged, or "rotated," while the horizontal and vertical synchronization and blanking intervals are left intact. After transmission and reception of the video signal, the signal is unscrambled in a decoder by reversing the line spin scrambling applied to each video line in the encoder. The spin breakpoint of each scrambled video line is determined in the decoder by an identical pseudorandom number generator that is synchronized with the pseudorandom number generator in the encoder. A typical line spin scrambling system is disclosed in U.S. Pat. No. 4,070,693 to Shutterly.

Although line spin scrambling offers many advantages, it has certain disadvantages. One of the disadvantages is that an amplitude gap or discontinuity appears at the point in each scrambled video line where the two segments are pieced together. The amplitude gap results from the difference in the amplitudes at the beginning and the end of the active portion of each video line prior to line spin scrambling. This is because, after scrambling, these two amplitudes are positioned at the same point in the video line. The amplitude gap provides the location of the spin breakpoint in each scrambled video line and, therefore, allows a pirate to unscramble the scrambled video signal.

In addition to providing a means for unscrambling the scrambled video signal, the amplitude gap or discontinuity in each scrambled video line also causes a distortion in the unscrambled video line. The distortion results from the very high frequency content of the discontinuity and the limited bandwidth of conventional television transmission and reception systems The distortion occurs during the transmission and reception process and appears in the vicinity of the discontinuity in each scrambled video line. As a result of unscrambling, the distortion is shifted to the beginning and the end of the active portion of the unscrambled video line.

Another disadvantage of line spin scrambling is a distortion in the unscrambled video signal caused by line tilt. Line tilt is a sawtooth-shaped voltage error that also corrupts each video line during the transmission and reception process. The phase of the sawtooth waveform is such that a linear charge ramp occurs during the horizontal blanking interval and a linear discharge ramp occurs during the active portion of the video line. The linear discharge ramp corrupts the active portion of each video line whether the video line is scrambled with the line spin technique or not. However, the effect on a received picture is generally undetectable when a video signal has not been line-spin scrambled. This is because the amplitude and phase of the line tilt are approximately the same for all video lines and, therefore, the effect across the received picture is constant in the vertical direction and is a gradual luminance variation in the horizontal direction. However, a video line that has been line-spin scrambled has the full amplitude of the line tilt applied at a single point, where the two segments are pieced back together during unscrambling. This causes a sharp luminance discontinuity at the randomly chosen spin breakpoint in each video line, resulting in a chaotic hashing of luminance striations in the received picture.

Although the video component of a television signal can be made relatively secure by line spin scrambling, the audio component of the television signal is preferably made secure by digital encryption techniques. Because of the increasing popularity of stereo television broadcasts, the audio signal is frequently a stereo audio signal. However, a conventional NTSC (National Television System Committee) television signal provides only a single channel for the audio signal on a subcarrier frequency at 4.5 MHz above the video carrier frequency. The 4.5 MHz audio channel is not sufficiently separated from the video upper bandwidth at 4.2 MHz to easily accommodate the bandwidth required for a stereo audio signal.

Various techniques, which vary depending upon the mode of transmission of the television signal, have been devised for transmitting stereo audio within these bandwidth limitations. For ground-based television transmission systems, such as over-the-air or cable transmission systems, the bandwidth of the television signal is generally limited to 4.5 MHz. One technique for transmitting stereo audio within this 4.5 MHz bandwidth limitation is to transmit the stereo audio signal in a burst during the video horizontal blanking interval. However, a digitally-encrypted stereo audio signal cannot be transmitted during the brief horizontal blanking interval unless the digitized signal is either compressed or the sampling rate of the stereo audio signal is reduced below the Nyquist sampling rate. Both of these alternatives severely degrade the quality of the stereo sound. In addition, transmitting an audio signal during the video horizontal blanking interval destroys both the video horizontal synchronization signal and the video color burst signal.

For satellite-based transmission systems, analog stereo audio signals are frequently transmitted over two separate channels at subcarrier frequencies of 5.8 and 7.6 MHz above the video carrier frequency. The two channels are necessary because the conventional NTSC audio channel at 4.5 MHz interferes with the video signal and, therefore, is generally not transmitted. However, the two satellite channels are typically analog channels and cannot accommodate the bandwidth required for transmission of a digitally-encrypted stereo audio signal, unless the digitized signal is either compressed or the sampling rate of the stereo audio signal is reduced below the Nyquist sampling rate.

Accordingly, there has been a long existing need in the broadcasting industry for an improved television transmission and reception system employing line spin scrambling for the video signal and digital encryption for the audio signal. The line-spin scrambled video signal should be capable of being transmitted and received without suffering from the disadvantageous effects caused by amplitude gaps and line tilt. The digitally-encrypted audio signal should be capable of being transmitted and received within the bandwidth limitations of the conventional NTSC or satellite television signal without the digitized audio signal being compressed or the sampling rate of the audio signal being reduced below the Nyquist sampling rate. The present invention clearly fulfills these needs.

SUMMARY OF THE INVENTION

The present invention resides in a television signal encoding and decoding system providing a line-spin scrambled video signal with substantially reduced amplitude gaps and line tilt and a digitally-encrypted audio signal that can be transmitted within the bandwidth limitations of a conventional NTSC television signal. Briefly, and in general terms, the television signal encoding system, located at a television transmitter, includes a video and an audio encoder. The video encoder selectively line spin scrambles, reverses and inverts certain video lines or video line segments to generate a line-spin scrambled video signal having amplitude gaps less than some desired value. The audio encoder digitally encrypts the audio signal and modulates the encrypted audio signal with a three-level partial response waveform to generate an encrypted audio signal that can be transmitted within the bandwidth limitations of a conventional NTSC television signal. The television signal decoding system, located at a television receiver, includes a video and an audio decoder. The video decoder applies line tilt compensation to the received line-spin scrambled video signal and then unscrambles the compensated scrambled video signal. The audio decoder demodulates and decrypts the received audio signal.

More specifically, the video signal is digitized in the video encoder by an analog-to-digital converter. A digital timing signal generator synchronizes the sampling rate of the analog-to-digital converter with a color burst signal included in the digitized video signal The digitized video signal is stored, one horizontal line of video at a time, in a random access memory. The stored samples of each video line are read from the random access memory in a sequence, and then inverted in an inverter, according to the particular inverse, reverse and line spin scrambling transforms being applied to the video line or video line segment to minimize the amplitude gap. A pseudorandom number generator provides the line spin scrambling breakpoint.

A transform identifier, which indicates what particular transforms have been applied to each video line, is encrypted in an encryptor along with a pseudorandom number generator seed value. The transform identifier is used for unscrambling the scrambled video signal and the seed value is used to synchronize the pseudorandom number generator with a similar pseudorandom number generator at the receiver. The encrypted transform identifier and seed value are then inserted into the horizontal blanking interval of the line-spin scrambled video signal.

The audio encoder digitally encrypts and modulates the audio signal, which, in the presently preferred embodiment of the invention, is a stereo audio signal. The stereo audio signal is modulated with the three-level partial response waveform, a pulse modulated code utilizing three-level coded pulses rather than conventional on-off or two-level coded pulses. This results in a bandwidth reduction of approximately 50% over two-level pulse code modulation, thus allowing the modulated stereo audio signal to be transmitted within the bandwidth limitations of the conventional NTSC television signal. In a presently preferred embodiment of the invention, for implementation in satellite-based transmission systems, the stereo audio signal is modulated with the three-level partial response waveform and then digitally up-converted to a 6.6 MHz quadrature subcarrier frequency. In another presently preferred embodiment of the invention, for implementation in ground-based transmission systems, the modulated stereo audio signal is multiplexed into the video signal during the video horizontal blanking interval.

At a receiver, the line-spin scrambled video signal is digitized in the video decoder by an analog-to-digital converter. A digital timing signal generator synchronizes the sampling rate of the analog-to-digital converter with the color burst signal included in the digitized scrambled video signal. Line tilt compensation is then applied to the digitized scrambled video signal in a line tilt compensation circuit. The compensated scrambled video signal is stored, one horizontal line of scrambled video at a time, in a random access memory. The stored samples of each video line are read from the random access memory in a sequence, and then inverted in an inverter, according to the particular inverse, reverse and line spin scrambling transforms applied to the video line in the video encoder. A pseudorandom number generator provides the same line spin scrambling breakpoint that was applied to the video line in the video encoder.

The transform identifier and pseudorandom number generator seed value, which were encrypted and inserted into the horizontal blanking interval in the video encoder, are removed from the horizontal blanking interval of the scrambled video signal and decrypted by a decryptor. The transform identifier provides the identity of the particular transforms applied to the video lines in the encoder and the seed value synchronizes the pseudorandom number generator in the video decoder with the pseudorandom number generator in the video encoder.

The line tilt compensation circuit applies line tilt compensation to the line-spin scrambled video signal by measuring the amplitude of the line tilt present in the scrambled video signal and then summing a complementary ramp based on the measured amplitude with each line of the scrambled video signal prior to unscrambling. The amplitude of the line tilt is measured by inserting a dummy video line having a constant-amplitude active portion into the video signal at the video encoder and then, after transmission, measuring the difference in the amplitude at the beginning and the amplitude at the end of the active portion of the dummy video line.

The audio decoder demodulates and decrypts the partial-response modulated stereo audio signal. The modulated stereo audio signal is first digitized by an analog-to-digital converter. The stereo audio signal is then recovered from the digitized modulated stereo audio signal through an RF sampling of the digitized audio signal. RF sampling is a data recovery method by which the audio data can recovered directly from the 6.6 MHz quadrature subcarrier frequency signal, without first down-converting the audio signal from the subcarrier frequency.

It will be appreciated from the foregoing that the present invention provides greatly improved transmission and reception characteristics for a line-spin scrambled video signal and a digitally-encrypted audio signal. Other features and advantages of the present invention will become apparent from the following more detailed description, taken in conjunction with the accompanying drawings, which illustrate, by way of example, the principles of the invention.

BRIEF DESCRIPTION OF THE DRAWINGS

FIG. 12 is a block diagram of a television signal decoding apparatus illustrating the basic system components, including an audio decoder and a line tilt compensation circuit;

FIG. 14 is a block diagram of the line tilt compensation circuit;

FIG. 15 is a block diagram of the audio decoder illustrating the basic subsystem components, including a staggered quadrature partial response (SQPR) demodulator.

DETAILED DESCRIPTION OF THE PREFERRED EMBODIMENTS

Figure 1:
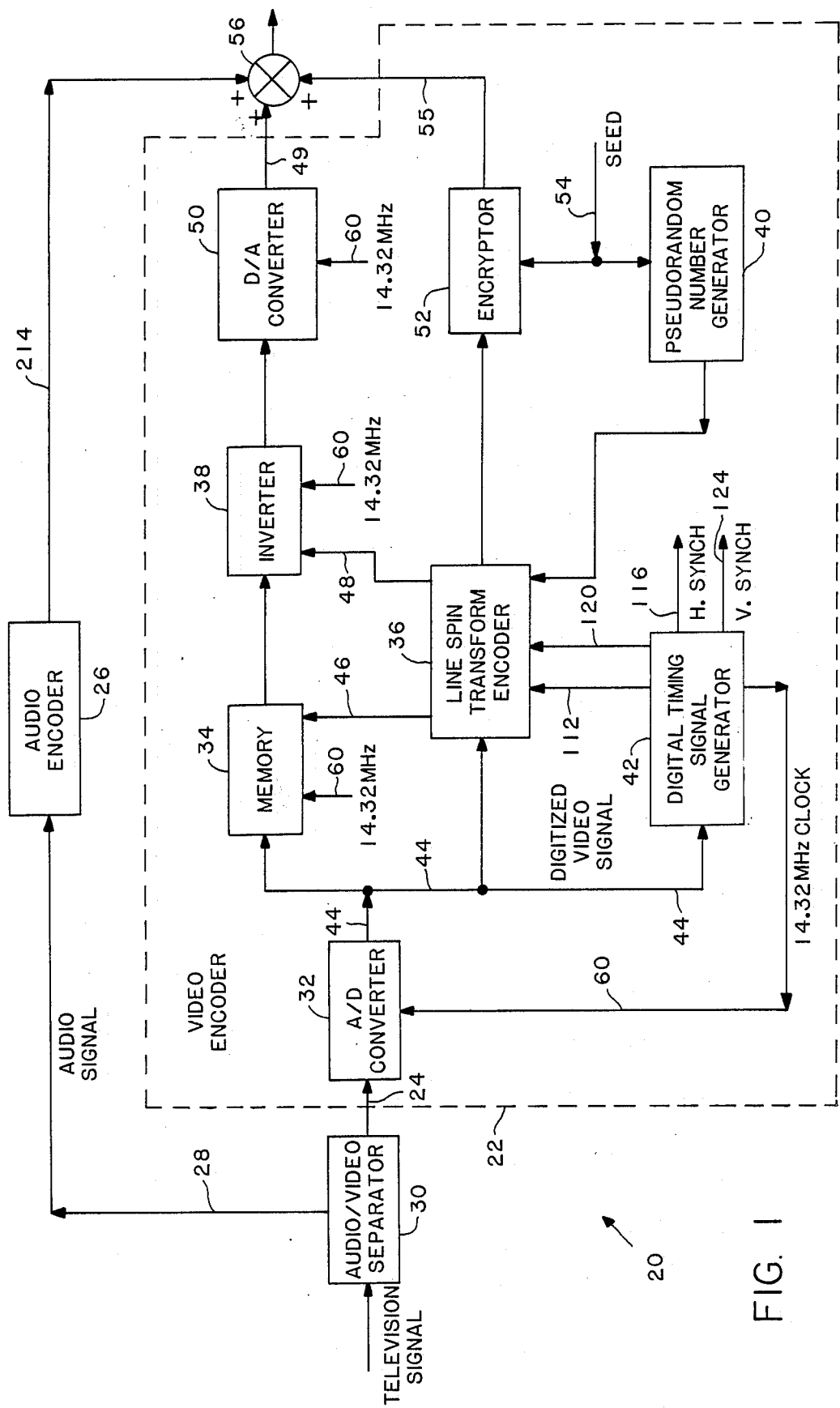
FIG. 1 is a block diagram of a television signal encoding apparatus illustrating the basic system components, including an audio encoder and a digital timing signal generator.

As shown in the drawings for purposes of illustration, the present invention is embodied in a television signal encoding and decoding system providing a line-spin scrambled video signal with substantially reduced amplitude gaps and line tilt and an encrypted audio signal that can be transmitted within the bandwidth limitations of a conventional NTSC television signal. Various encoding techniques have been developed for transmitting and receiving secure television signals. One video encoding technique that provides a relatively secure video signal, with a modest amount of complexity and cost, is line spin scrambling. However, line spin scrambling has certain disadvantages. One disadvantage is that amplitude gaps and line tilt distort the line-spin scrambled video signal. Another disadvantage is that a pirate can unscramble the line-spin scrambled video signal by detecting the location of the amplitude gap in each line-spin scrambled video line. The audio component of a television signal is preferably made secure by digital encryption techniques. However, the single NTSC audio channel is not sufficiently separated from the video bandwidth to easily accommodate the bandwidth required by a digitally-encrypted audio signal, unless the digitized audio signal is either compressed or the sampling rate of the audio signal is reduced below the Nyquist sampling rate.

In accordance with the present invention, the television encoding system, located at a television transmitter, includes a video and an audio encoder. The video encoder selectively line spin scrambles, reverses and inverts certain video lines or video line segments to generate a line-spin scrambled video signal having amplitude gaps less than some desired value. The audio encoder digitally encrypts the audio signal and modulates the encrypted audio signal with a three-level partial response waveform to generate an encrypted audio signal that can be transmitted within the bandwidth limitations of the conventional NTSC television signal. The television decoding system, located at a television receiver, includes a video and an audio decoder. The video decoder applies line tilt compensation to the received line-spin scrambled video signal and then unscrambles the compensated scrambled video signal. The audio decoder demodulates and decrypts the received audio signal.

TELEVISION SIGNAL ENCODING SYSTEM

FIG. 1 illustrates a television signal encoding apparatus 20 in accordance with a presently preferred embodiment of the invention. The television signal encoding apparatus 20 includes a video encoder 22 for line spin scrambling the video component of a television signal, on line 24, and an audio encoder 26 for digitally encrypting and modulating the audio component of the television signal, on line 28. An audio/video separator 30, which can be a bandpass filter, separates the audio and video components of the television signal.

VIDEO ENCODER

The video encoder 22 includes an analog-to-digital converter 32, a random access memory 34, a line spin transform encoder 36, an inverter 38, a pseudorandom number generator 40 and a digital timing signal generator 42. The video signal on line 24, which includes a color burst signal and horizontal and vertical synchronization signals, is digitized by the analog-to-digital converter 32 at a sampling rate of 14.32 MHz, a frequency four times the frequency of the color burst signal. This sampling rate provides 910 digital samples for each video line. The digitized video signal, on line 44, is stored, one horizontal line of video at a time, in the random access memory 34. The stored samples of each video line are read from the random access memory 34 in a sequence and inverted in the inverter 38 according to the particular reverse, inverse and line spin scrambling transforms to be applied to the video line or video line segment. The pseudorandom number generator 40 provides the line spin scrambling breakpoint. The line spin transform encoder 36 controls the application of the line spin scrambling, reverse and inverse transforms to the video line or video line segment by the memory 34 and the inverter 38. The digital timing signal generator 42 synchronizes the sampling rate of the analog-to-digital converter 32 with the color burst signal in the digitized video signal on line 44.

A video line or video line segment is reversed in the random access memory 34 by reading the video line or video line segment from memory 34 in reverse order. A video line is line spin scrambled in the random access memory 34 by interchanging the order that the two segments are read from memory 34. The inverse transform is applied in the inverter 38 by subtracting the amplitude of a stored sample from the sample's maximum amplitude of 100 IRE (Institute of Radio Engineers) units. Zero IRE units is full-scale black and 100 IRE units is full-scale white on the luminance scale. The line spin transform encoder 36 applies the reverse or line spin scrambling transform to each video line or video line segment by sending the appropriate address information to the random access memory 34, on line 46. The line spin transform encoder 36 applies the inverse transform to each video line or video line segment by engaging the inverter 38 with an invert signal, on line 48.

The digitized line-spin scrambled video signal output by the inverter 38 is converted into an analog line-spin scrambled video signal, on line 49, by a digital-to-analog converter 50. The line spin transform encoder 36 outputs to an encryptor 52 a transform identifier indicating what particular transforms have been applied to each video line. The transform identifier, which is used to unscramble the video signal at a receiver, is encrypted in the encryptor 52 along with a pseudorandom number generator seed value, on line 54. The seed value on line 54 is used to synchronize pseudorandom number generator 40 with a similar pseudorandom number generator at the receiver. The encrypted transform identifier and seed value, on line 55, are inserted into the horizontal blanking interval of the line-spin scrambled video signal at a summer 56. The analog-to-digital converter 32, random access memory 34, inverter 38 and digital-to-analog converter 50 are clocked by a 14.32 MHz clock signal, output by the digital timing signal generator 42, on line 60.

Amplitude Gap Reduction

The line spin transform encoder 36 selectively line spin scrambles, reverses and inverts particular video lines or video line segments to generate a line-spin scrambled video signal having amplitude gaps less than some desired value. This reduction of the amplitude gaps is described in detail in the parent application of the present application entitled "Minimization of Amplitude Gaps in a Line-Spin Scrambled Signal," Ser. No. 831,941, filed on Feb. 24, 1986, which is attached as Appendix A to this application and is incorporated herein by reference.

Figure 2A:
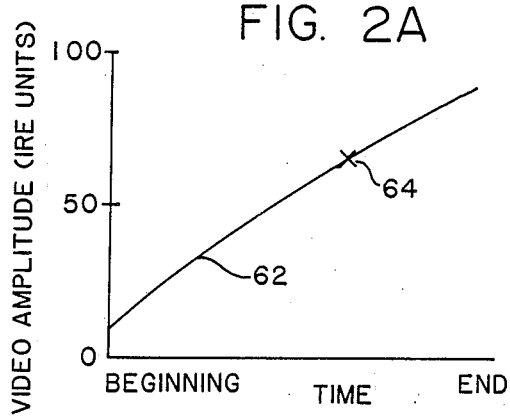
FIGS. 2A–2C are voltage-time graphs of the active portion of a video line before line spin scrambling, after line spin scrambling and with the second segment inverted.
Figure 2B:
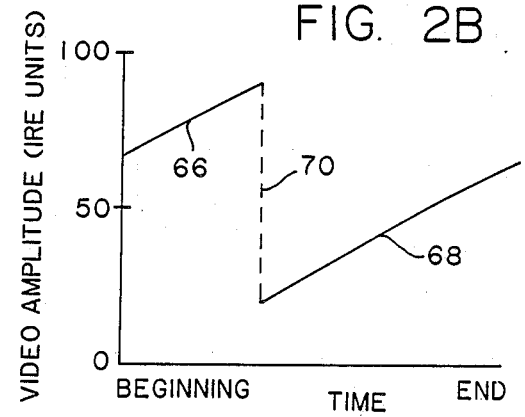

FIG. 2A shows the active portion of a horizontal video line 62 prior to line spin scrambling about a pseudorandom breakpoint 64. FIG. 2B shows the video line 62 after line spin scrambling, the line-spin scrambled video line having two interchanged video line segments 66, 68. Segment 66 includes the portion of video line 62 from the spin breakpoint 64 to the end of the active portion of the video line and segment 68 includes the portion of video line 62 from the beginning of the active portion of the video line to the spin breakpoint 64. The difference between the amplitude at the beginning and the amplitude at the end of the active portion of video line 62 causes an amplitude gap 70 in the line-spin scrambled video line.

Figure 2C:
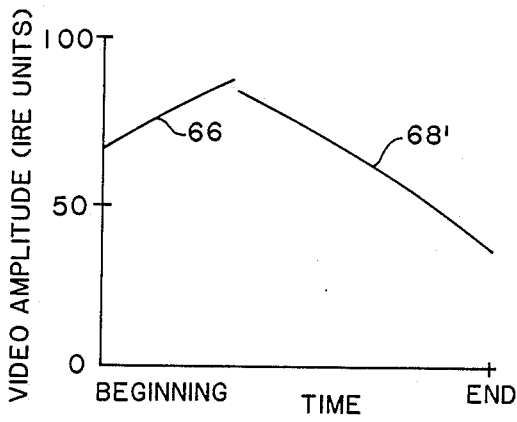

In accordance with a presently preferred embodiment of the invention, which provides a line-spin scrambled video signal having amplitude gaps less than 50 IRE, video line 62 is line spin scrambled as shown in FIG. 2B. After line spin scrambling, video line segment 68 is inverted if the resulting amplitude gap 70 is greater than 50 IRE units. Segment 68 is inverted in inverter 38 by subtracting the sampled amplitudes across the segment from 100 IRE units. FIG. 2C shows the line-spin scrambled video line having an inverted video line segment 68'. Alternatively, video line segment 66 can be inverted rather than segment 68.

Figure 3:
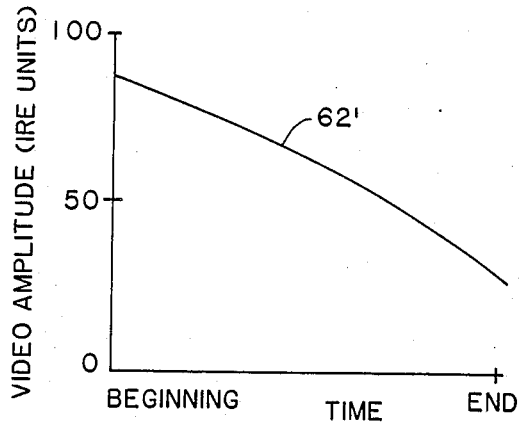
FIG. 3 is a voltage-time graph of the video line of FIG. 2A reversed.

In accordance with another presently preferred embodiment of the invention, which provides a line-spin scrambled video signal having amplitude gaps less than some preselected value, such as 20 IRE units, video line 62 is line spin scrambled only if the resulting amplitude gap 70 is less than or equal to the preselected value. If amplitude gap 70 is not less than or equal to the preselected value, video line 62 is not line spin scrambled, but is reversed. FIG. 3 shows a reversed video line 62'. If the next video line also has an amplitude gap that is not less than or equal to the preselected value and, therefore, is not line spin scrambled, this video line is not reversed, but is transmitted in its original form. Therefore, large blocks of video lines that are not line spin scrambled are still encoded, since every other video line is reversed.

Figure 4A:
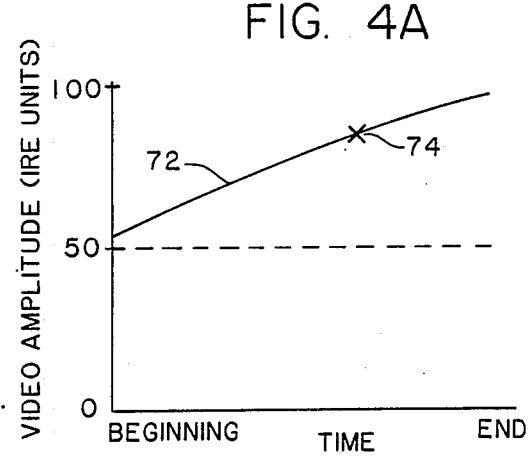
FIGS. 4A–4C are voltage-time graphs of the active portion of a video line before line spin scrambling, after line spin scrambling and with the second segment reversed.
Figure 4B:
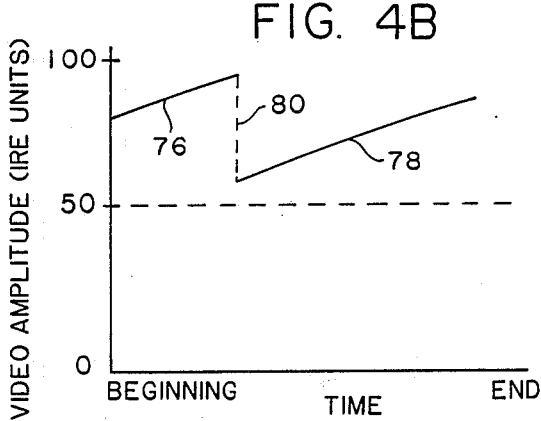
Figure 4C:
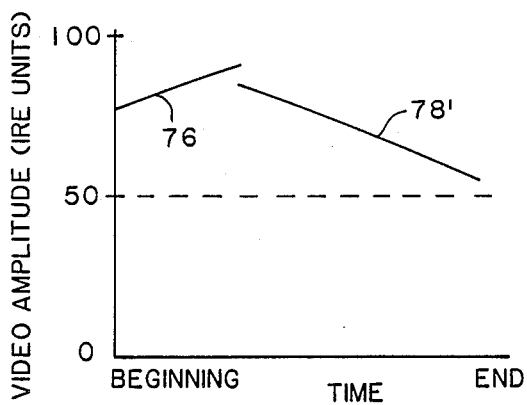

In accordance with another presently preferred embodiment of the invention, which provides a line-spin scrambled video signal having amplitude gaps less than some preselected value, such as 20 IRE units, a video line is line spin scrambled only if the resulting amplitude gap is less than or equal to the preselected value. If the amplitude gap is not less than or equal to the preselected value, the video line may still be line spin scrambled if the following conditions are met. A video line having an amplitude gap greater than the preselected value is line spin scrambled if the beginning and the end of the active portion of the video line are both above or below the 50 IRE unit reference line and if the amplitude gap can be reduced to at least the preselected value by reversing one of the segments after the line spin scrambling. FIG. 4A shows a video line 72 having end points above the 50 IRE unit reference line. Scrambling the video line 72 about a spin breakpoint 74, as shown in FIG. 4B, results in a line-spin scrambled video line having two interchanged segments 76, 78 and an amplitude gap 80 greater than 20 IRE units. However, as shown in FIG. 4C, amplitude gap 80 can be reduced to less than 20 IRE units by reversing the second segment 78. The reversed second segment and the reduced amplitude gap are indicated in FIG. 4C by segment 78' and amplitude gap 80', respectively.

Figure 5A:
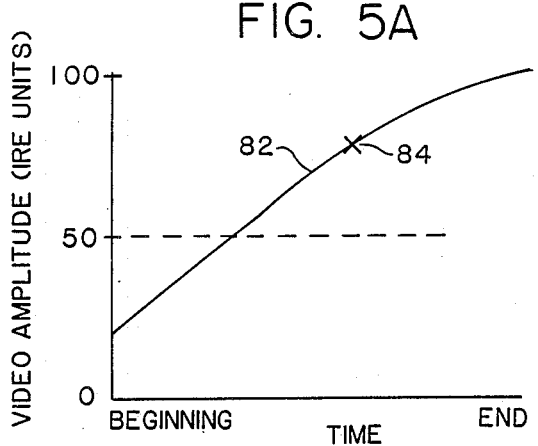
FIGS. 5A–5C are voltage-time graphs of the active portion of a video line before line spin scrambling, after line spin scrambling and with the second segment inverted.
Figure 5B:
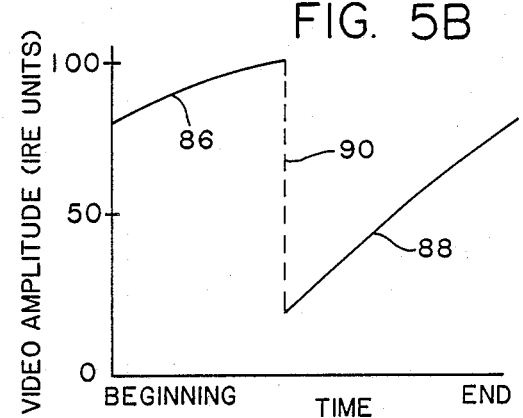
Figure 5C:
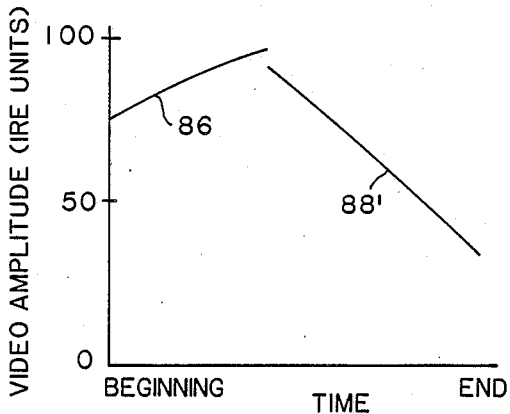

If the amplitude gap 80 cannot be reduced to at least the preselected value by reversing one of the segments, or if the beginning and the end of the active portion of the video line are not both above or below the 50 IRE reference line, a video line may still be line spin scrambled if the amplitude gap can be reduced to at least the preselected value by inverting one of the segments and reversing the other segment. FIG. 5A shows a video line 82 having a beginning and end that are not both above or below the 50 IRE unit reference line. Scrambling the video line 82 about a spin breakpoint 84, as shown in FIG. 5B, results in a line-spin scrambled video line having two interchanged segments 86, 88 and an amplitude gap 90 greater than 20 IRE units. However, as shown in FIG. 5C, amplitude gap 90 can be reduced to less than 20 IRE units by inverting the second segment 88. The inverted second segment and the reduced amplitude gap are indicated in FIG. 5C by segment 88' and amplitude gap 90', respectively. If the amplitude gap cannot be reduced to at least the preselected value by inverting one of the segments, the video line may still be line spin scrambled if the amplitude gap can be reduced to at least the preselected value by inverting one of the segments and reversing the other segment.

If the amplitude gap cannot be reduced to at least the preselected value by inverting one of the segments and reversing the other segment, the video line is not line spin scrambled, but is reversed. If the next video line also has an amplitude gap that is not less than or equal to the preselected value and, therefore, is not line spin scrambled, this video line is not reversed, but is transmitted in its original form. Therefore, large blocks of video lines that are not line spin scrambled are still encoded, since every other video line is reversed.

The line spin transform encoder 36 selectively applies the various line spin, reverse and inverse transforms to each video line by measuring amplitude differentials between several points along each video line. These amplitude differentials are computed by measuring the difference between the amplitude at the beginning and the amplitude at the end of the active portion of each video line and the difference between the amplitude at each endpoint and the amplitude at the spin breakpoint. The computation and application of these amplitude differentials is described in greater detail in the above-referenced parent application of the present application entitled "Minimization of Amplitude Gaps in a Line-Spin Scrambled Signal."

Line Spin Transform Encoder

Figure 6:
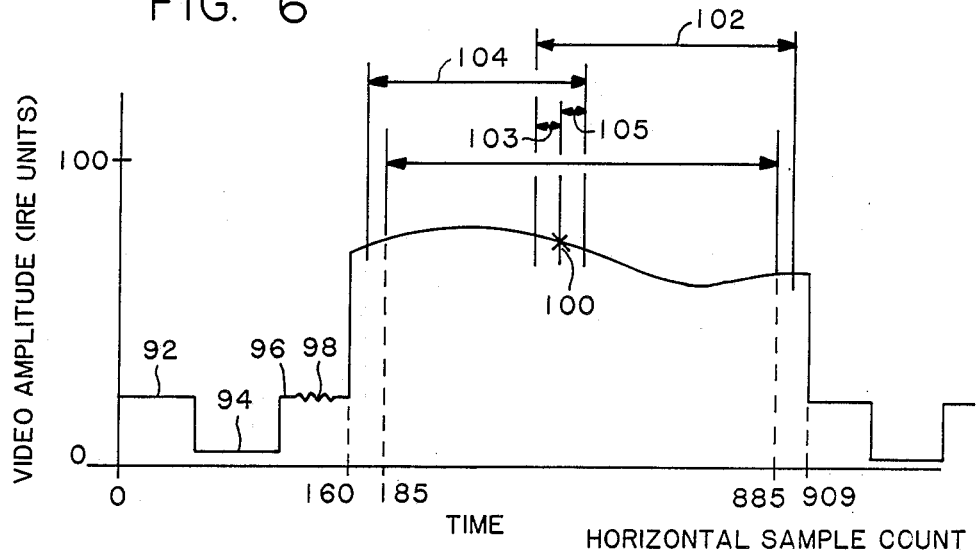
FIG. 6 is a voltage-time graph of a video line illustrating the application of a guard strip with a line spin scrambling transform.

The line spin transform encoder 36 applies the line spin scrambling transform to a video line as shown in FIG. 6. FIG. 6 illustrates a full video line, including an active portion from horizontal sample count 160 to sample count 909 and a horizontal blanking interval from horizontal sample count 0 to sample count 160. The horizontal blanking interval includes a front porch 92, a horizontal synch pulse 94 and a back porch 96 having an eight-cycle color burst signal 98. The line spin transform is applied to the active portion of the video line about a spin breakpoint 100. The spin breakpoint 100 is generated by the pseudorandom number generator 40 and can fall anywhere within the range from horizontal sample count 185 to sample count 885.

The line spin transform encoder 36 first addresses the random access memory 34 with the sequence of integers from 0 and 160 in order to read the horizontal blanking interval from memory 34. The line spin transform encoder 36 then addresses memory 34 with the sequence of integers from the sample count of the spin breakpoint minus a guard strip to the sample count of 909 minus the guard strip. This portion of the video line is indicated in FIG. 6 as segment 102 and the guard strip is indicated as segment 103. The guard strip, which is a constant between 5 and 20, prevents certain distortions from affecting the unscrambled video signal. These distortions occur during transmission and reception of the scrambled video signal due to the limited bandwidth of transmission and reception systems. The line spin transform encoder 36 then addresses memory 34 with the sequence of integers from the sample count of 160 plus the guard strip to the sample count of the spin breakpoint plus the guard strip. This portion of the video line is indicated in FIG. 6 as segment 104 and the guard strip is indicated as segment 105. When the line-spin scrambled video line is transmitted, the repeated guard strip information about the spin breakpoint 100, which is now at the endpoints of the active portion of the scrambled video line, will be distorted due to the limited bandwidth of the transmission and reception system rather than any other video information about the spin breakpoint.

Digital Timing Signal Generator

Figure 7:
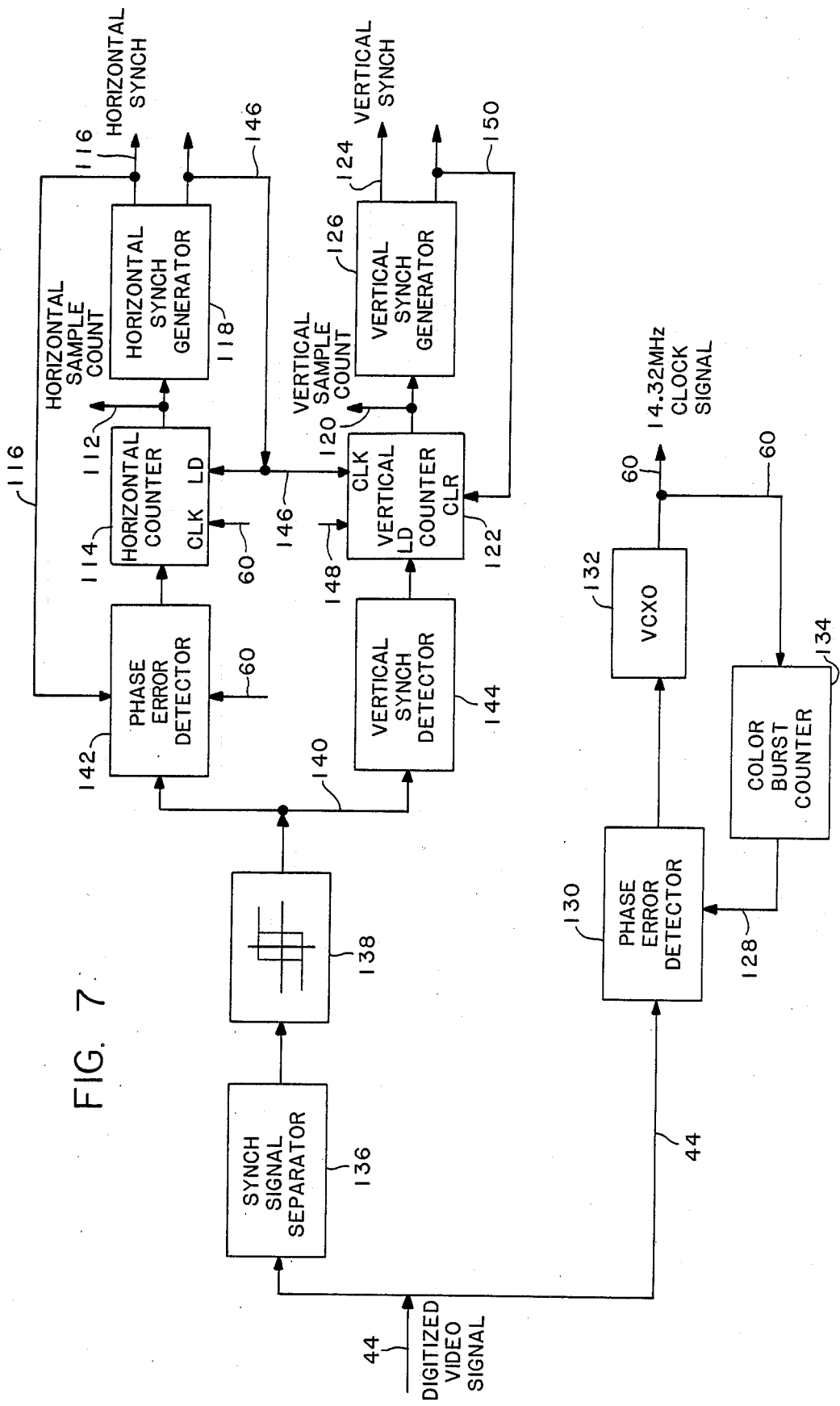
FIG. 7 is a block diagram of the digital timing signal generator.

The digital timing signal generator, shown in detail in FIG. 7, generates the various digital timing signals used in the video encoder 22. This generation of the various digital timing signals is described in detail in the parent application of the present application entitled "Synchronization of Digital Processing Timing Signals with a Video Signal," Ser. No. 829,268, filed on Feb. 14, 1986, which is attached as Appendix B to this application and is incorporated herein by reference.

The various digital timing signals include the 14.32 MHz master sampling clock signal on line 60, a horizontal sample count signal output on line 112 by a horizontal counter 114, a reference horizontal synch signal output on line 116 by a horizontal synch generator 118, a vertical sample count signal output on line 120 by a vertical counter 122, and a reference vertical synch signal output on line 124 by a vertical synch generator 126. The master sampling clock signal on line 60 regulates the sampling rate and the digital processing rate of the video signal. The horizontal and vertical sample count signals on lines 112, 120 provide the identifying means for each digital video sample. The reference horizontal and vertical synch signals on lines 116, 124 are internally-generated video synchronization signals.

As shown in FIG. 7, the master sampling clock signal on line 60 is synchronized with the color burst signal in the digitized video signal on line 44. The master sampling clock signal is synchronized by measuring the phase error between the digitized color burst signal and a color-burst-frequency signal, on line 128. The color-burst-frequency signal on line 128 is an internally-generated, digital reference signal at the frequency of the Video color burst signal. The phase error between these two signals is measured by a phase error detector 130 as described in greater detail in the above-referenced parent application of the present application entitled "Synchronization of Digital Processing Timing Signals with a Video Signal." The phase error controls the frequency of a voltage controlled oscillator 132, which generates the master sampling clock signal.

The master sampling clock signal on line 60 generates the color-burst-frequency signal on line 128 by driving a two-bit binary counter 134. The two-bit binary counter 134 converts the clock pulses at 14.32 MHz, which is four times the color burst frequency of 3.58 MHz, into a repetitive series of the binary numbers 00, 01, 10 and 11. The most significant bit of the binary numbers is a sign bit and, therefore, the series of binary numbers represents the amplitudes (+0, +1, −0 and −1) of a digital sine wave having a frequency of 3.58 MHz at the phase angles of 0, 90, 180 and 270 degrees, respectively.

As shown in FIG. 7, the horizontal sample count signal on line 112 and the reference horizontal synch signal on line 116 are synchronized with the video horizontal synch signal in the digitized video signal on line 44. In addition, the vertical sample count signal on line 120 and the reference vertical synch signal on line 124 are synchronized with the video vertical synch signal in the digitized video signal on line 44. The video horizontal and vertical synch signals are separated from the digitized video signal on line 44 with a synch signal separator 136 and applied to a hysteresis circuit 138 to reduce noise and false transitions of the synch signals. The synch signals are output by the hysteresis circuit 138 on line 140.

The horizontal sample count signal on line 112 is synchronized with the video horizontal synch signal on line 140 by measuring the phase error between the synch signal on line 140 and the reference horizontal synch signal on line 116 in a phase error detector 142. The horizontal synch generator 118 generates the reference horizontal synch signal on line 116 when addressed by the horizontal counter 114. The vertical sample count signal on line 120 is synchronized with the video vertical synch signal on line 140 by loading the vertical counter 122 with the line number of the video line having the vertical synch signal when that particular video line is detected by a vertical synch signal detector 144. The vertical synch signal generator 126 generates the reference vertical synch signal on line 124 When addressed by the vertical counter 122.

The horizontal counter 114, which is clocked by the master sampling clock signal on line 60, counts in increments of 1 from 0 to 909, corresponding to the 14.32 MHz sampling rate across one horizontal line of video.

The phase error detector 142 measures the phase error between the video horizontal synch signal on line 140 and the reference horizontal synch signal on line 116 by comparing the time of arrival of the leading edges of the two horizontal synch signals. The output of the phase error detector 142 is the number of 14.32 MHz sample counts between the two signals. The number of sample counts is loaded into the horizontal counter 114 by a load pulse that is generated at the end of every horizontal line, at the count of 909. The load pulse is generated by the horizontal synch signal generator 118 and is output on line 146. Therefore, the horizontal counter 114 starts counting at the beginning of the next horizontal line with the number of sample counts, plus or minus, that the two horizontal synch signals are apart.

The vertical counter 122, which is clocked by the horizontal counter load pulse on line 146, counts in increments of 1 from 0 to 524, corresponding to the 525 horizontal lines per frame of video. The vertical sample count signal on line 120 is synchronized by loading the vertical counter 122 with the line number of the video line having the vertical synch signal when that particular video line is detected by the vertical synch signal detector 144. The line number of the video line having the vertical synchronization signal is a constant and is loaded into the vertical counter 122 on line 148. The vertical counter 122 is reset to zero by a clear pulse, which is output on line 150 by the vertical synch signal generator 126 at the count of 524.

AUDIO ENCODER

The audio encoder 26 digitally encrypts and modulates the audio component of the television signal on line 28. In the presently preferred embodiment of the invention, the audio signal is a stereo audio signal. The stereo audio signal is modulated with a three-level partial response waveform, a pulse modulated code utilizing three-level coded pulses rather than conventional on-off or two-level coded pulses. This results in a bandwidth reduction of approximately 50% over two-level pulse code modulation, thus allowing the modulated stereo audio signal to be transmitted within the bandwidth limitations of the conventional NTSC television signal. This modulation of the stereo audio signal is described in detail in the parent application of the present application entitled "Transmission and Reception of Television Broadcasts in High-Fidelity Stereo Audio," Ser. No. 878,735, filed on June 26, 1986, which is attached as Appendix C to this application and is incorporated herein by reference.

In a presently preferred embodiment of the invention, for implementation in satellite-based transmission systems, the stereo audio signal is modulated with the three-level partial response waveform and then digitally up-converted to a 6.6 MHz quadrature subcarrier frequency. In another presently preferred embodiment of the invention, for implementation in ground-based transmission systems, the modulated stereo audio signal is multiplexed into the video signal during the video horizontal blanking interval.

Satellite-Based Transmission System

Figure 8:
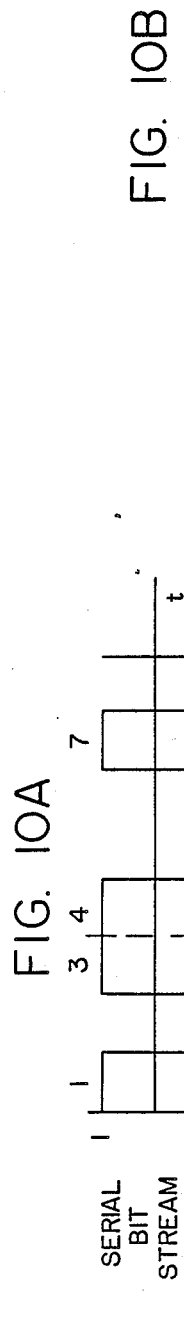
FIG. 8 is a block diagram of the audio encoder illustrating the basic subsystem components, including a staggered quadrature partial response (SQPR) modulator.

FIG. 8 shows a stereo audio encoder 26 for encoding a stereo audio signal to be transmitted over a satellite-based transmission system. The audio encoder 26 includes an analog-to-digital converter 160 that digitizes the left and right channels of the stereo audio signal on line 28, an encryptor 162 that encrypts the digitized stereo audio signal, a burst formatter 164 that bursts out the digitized stereo audio signal at a higher data rate to allow additional data to be appended to the digitized audio signal, an error correction encoder 166 that encodes the digitized stereo audio signal for error correction, a randomizer 168 that ensures a random bit stream for modulation, and a staggered quadrature partial response (SQPR) modulator 170 that modulates the digitized stereo audio signal with the three-level, partial response waveform and then digitally up-converts the modulated audio signal to a 6.6 MHz quadrature subcarrier frequency for satellite transmission.

More specifically, the analog-to-digital converter 160 digitizes the left and right channels of the stereo audio signal on line 28 at a sampling rate of 78.67 KHz. The 78.67 KHz sampling rate is locked to the video signal and is 5.0 times the video horizontal line rate of 15.734 KHz. Therefore, five samples of digitized stereo audio are generated for each channel during every horizontal line of video. The output of the analog-to-digital converter 160 is a serial bit stream of left and right digitized audio samples, on line 172.

The serial bit stream of left and right digitized audio samples on line 172 is then encrypted in the encryptor 162. In the presently preferred embodiment of the invention, the bit stream is encrypted in the encryptor 162 by adding each bit of each audio sample to the pseudorandom number generator seed value on line 54. The output of the encryptor 162, a parallel bit stream of left and right encrypted audio samples, is then output to the burst formatter 164. The burst formatter 164 converts the parallel bit stream of left and right encrypted audio samples to a serial bit stream and bursts out the serial bit stream, five samples at a time, at a 1.652 MHz bit rate to allow for the later insertion of a 30 bit data channel.

The serial bit stream of encrypted audio samples is encoded for error correction in the error correction encoder 166 by appending 15 parity bits to every five audio samples. The output of the error correction encoder 166 is a 75-bit serial bit stream of encrypted and error-encoded audio samples. A 30-bit data channel, on line 174, is then multiplexed in with the serial bit stream of encrypted audio samples by a multiplexer 176. The 30-bit data channel, at a data rate of 472 KHz, can be used to transmit additional digital information. The output of the multiplexer 176 is a continuous 105-bit serial stream of data and encrypted and error-encoded audio samples at a bit rate of 1.652 MHz.

The serial bit stream of data and encrypted and error-encoded audio samples is randomized by the randomizer 138 prior to modulation to ensure that the modulation is performed on a time-varying bit stream. In the presently preferred embodiment of the invention, the serial bit stream is randomized by applying each bit of each audio sample to an exclusive-OR gate with the random bit stream from the pseudorandom number generator 40.

Figure 9:
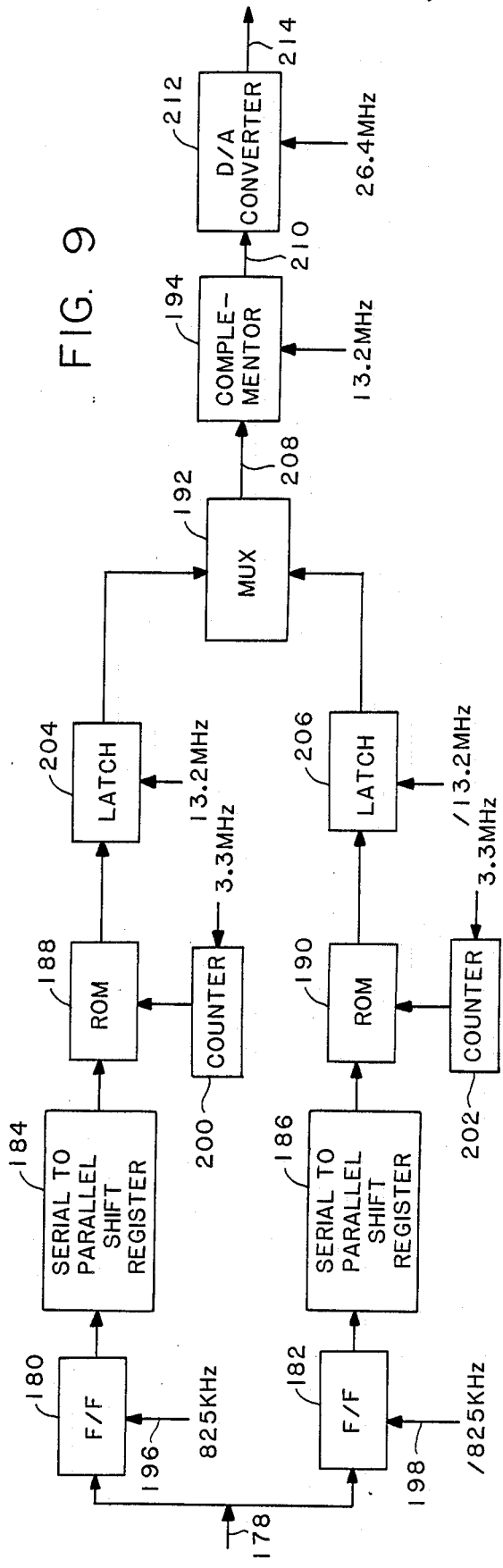
FIG. 9 is a block diagram of the SQPR modulator.

The output of the randomizer 168, a random serial bit stream of data and encrypted and error-encoded audio samples, on line 178, is applied to the staggered quadrature partial response (SQPR) modulator 170. As shown in detail in FIG. 9, the SQPR modulator 170 includes, in parallel, a pair of flip-flops 180, 182 that convert the serial bit stream of data and audio samples on line 178 into parallel in-phase (I) and staggered quadrature-phase (Q) symbol streams and a pair of serial-to-parallel shift registers 184, 186 that store and output the last eight symbol values of the I and Q symbol streams. The SQPR modulator 170 also includes, in parallel, a pair of read-only-memories (ROMs) 188, 190 that output stored 3-level, partial response waveforms according to the input values of the I and Q symbol streams, a multiplexer 192 that combines the partial response waveforms, and a complementor 194 that digitally up-converts the combined partial response waveforms to a subcarrier frequency.

Figure 10A:
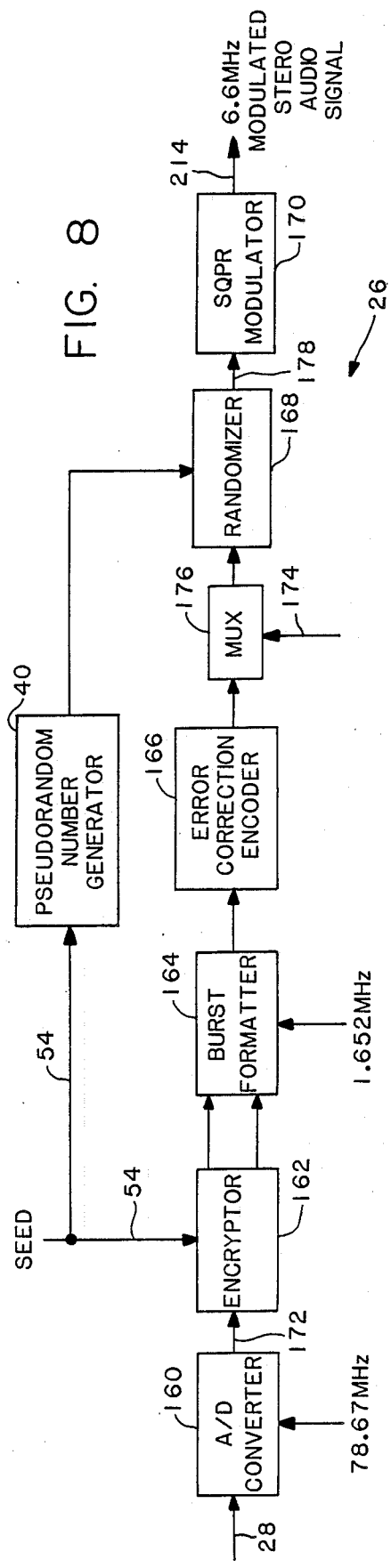
FIGS. 10A–10B are voltage-time graphs illustrating a serial bit stream of ones and zeroes and the corresponding in-phase and quadrature-phase symbol streams before and after differential encoding.

More specifically, the pair of flip-flops 180, 182 convert the serial bit stream of data and encrypted and error-encoded audio samples on line 178, at a bit rate of 1.652 MHz, into parallel in-phase (I) and staggered quadrature-phase (Q) symbol streams at a symbol rate of $1/T_s = 825$ KHz, or half the incoming bit rate of 1.652 MHz. As illustrated in FIG. 10A, each bit is converted into a symbol having twice the time duration of the bit. The quadrature-phase (Q) symbol stream is offset or staggered by half a symbol in relation to the in-phase (I) symbol stream by delaying the quadrature-phase (Q) symbol stream for one bit, or 90 degrees. Staggering the I and Q symbol streams prevents phase transitions from occurring simultaneously in the two symbol streams, thus reducing the maximum phase transition from 180 to 90 degrees and substantially reducing the amplitude variations in the envelope of the modulated signal.

Figure 10B:
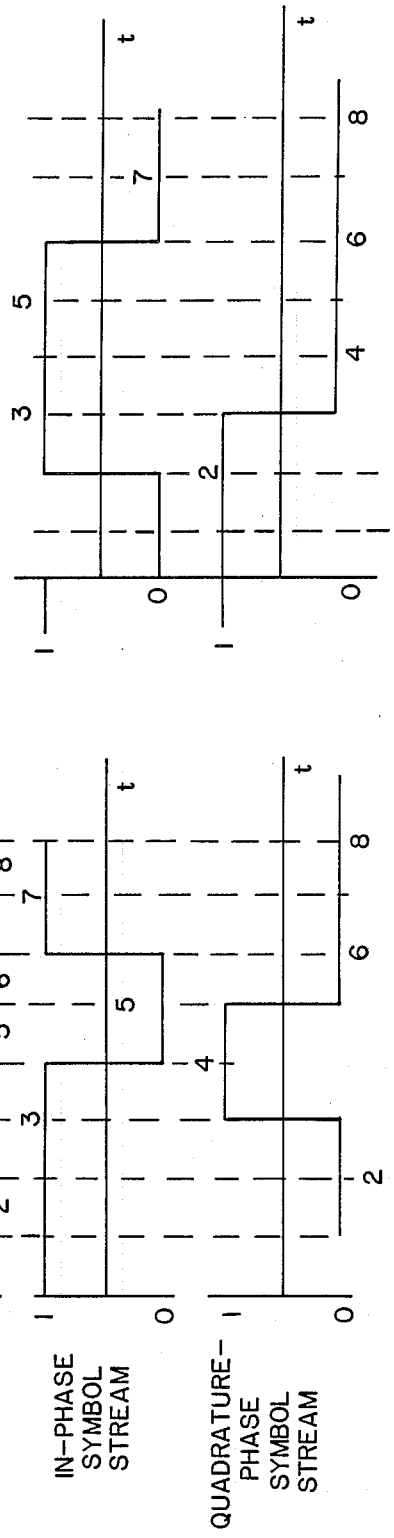

Converting the bit stream of audio samples on line 178 into a pair of staggered symbol streams is achieved by clocking the flip-flop 180 with a 825 KHz clock signal, on line 196, and the flip-flop 182 with a 825 KHz clock signal, on line 198. The 825 KHz clock signal on line 198 is 180 degrees out of phase with the 825 KHz clock signal on line 196, thus providing the stagger between the two symbol streams. The flip-flops 180, 182 also provide a type of differential encoding of the serial bit stream on line 178. The flip-flops 180, 182 toggle or change state if the input is a one and do not toggle or change state if the input is a zero. FIG. 10B illustrates the effect of this differential encoding on the symbol streams shown in FIG. 10A. Each of the differentially-encoded symbols has a state opposite that of the immediately preceding differentially-encoded symbol when the symbol to be encoded is a one, while each of the differentially-encoded symbols has a state equal that of the immediately preceding differentially-encoded symbol when the symbol to be encoded is a zero. In FIG. 10B, the immediately preceding differentially-encoded symbol for each of the symbols 1 and 2 was arbitrarily chosen as a one.

The serial-to-parallel shift registers 184, 186 store and output the last eight symbol values of the I and Q symbol streams. These eight symbol values represent the most significant eight bits of a ten bit address for each of the ROMs 188, 190. Four eight-bit amplitudes of the 3-level, partial response waveforms are stored in the ROMs 188, 190 for each of the possible 256 combinations of the eight symbols. The four amplitudes correspond to points on the partial response waveforms at every 90 degrees, or at $T_s/4$ seconds. Two bit counters 200, 202, driven by a clock signal at $4/T_s$ Hz, or 3.3 MHz, generate the least significant two bits. The four eight-bit amplitudes of the 3-level, partial response waveforms are computed for each of the possible 256 eight-symbol combinations of ones and zeroes. The computation of the partial-response waveform amplitudes is described in greater detail in the above-referenced parent application of the present application entitled "Transmission and Reception of Television Broadcasts in High-Fidelity Stereo Audio."

The four-sample partial response waveforms are output by the ROMs 188, 190 at a sampling rate of 3.3 MHz and digitally up-converted to a 6.6 MHZ quadrature subcarrier, for satellite transmission, by multiplexing and complementing the partial response waveforms. The outputs of the ROMs 188, 190 are first latched into latches 204, 206, respectively. Each of the latches 204, 206 operates at 13.2 MHz and, therefore, outputs four eight-bit samples for each incoming eight-bit sample of the partial response waveform. These samples are then multiplexed in the multiplexer 192 to form, on line 208, a digital stream of alternating eight-bit samples of in-phase (I) and quadrature-phase (Q) partial response waveforms at 26.4 MHz. The digital stream on line 208 is then complemented in the complementor 194 at 13.2 MHz to digitally up-convert the digital stream to the 6.6 MHz quadrature subcarrier frequency, which is output on line 210. The output of the complementor 94 on line 210 is converted into an analog signal by a digital-to-analog converter 212. The digital-to-analog converter 212 operates at four times the subcarrier frequency of 6.6 MHz, or 26.4 MHz.

Figure 11:
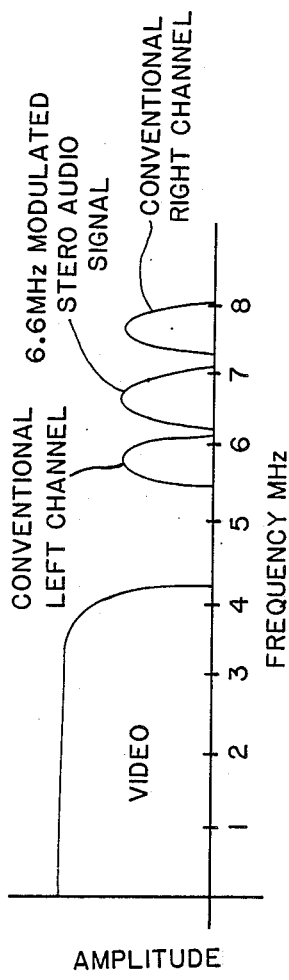
FIG. 11 is a voltage-frequency graph of an 8 MHz bandwidth video and audio signal.

The output of the digital-to-analog converter 212 is a 6.6 MHz modulated stereo audio signal, on line 214. As shown in FIG. 1, the modulated stereo audio signal on line 214 is then summed with the line-spin scrambled video signal on line 51 and the encrypted transform identifier and seed value on line 55 at the summer 56. Because of the approximate 50% reduction in bandwidth provided by the 3-level, partial response modulation when compared with conventional pulse code modulation utilizing 2-level coded pulses, the 6.6 MHz modulated stereo audio signal can be easily inserted, with minimum interference, between the conventional satellite audio channels at 5.8 and 7.6 MHz, as shown in FIG. 11.

Ground-Based Transmission System

In another presently preferred embodiment of the invention for implementation in ground-based transmission systems, such as over-the-air or cable transmission systems, the audio encoding steps are essentially the same as those employed in the satellite-based transmission system, with one major exception. Rather than transmitting the two channels of stereo audio continuously over a separate subcarrier frequency, the five modulated left and right audio samples are multiplexed into the video signal during the video horizontal blanking interval. This is necessary because ground-based transmission systems are generally limited to the conventional NTSC 4.5 MHz bandwidth. The 3-level, partial response modulation allows the modulated audio samples to be burst out during the horizontal blanking interval, within the 4.2 MHz video bandwidth, without compression or reduction of the sampling rate of the stereo audio signal, and without interference with the NTSC audio channel at 4.5 MHz.

TELEVISION SIGNAL DECODING SYSTEM

FIG. 12 illustrates a television signal decoding apparatus 220 in accordance with a presently preferred embodiment of the invention. The television signal decoding apparatus 220 includes a video decoder 222 that applies line tilt compensation to a line-spin scrambled video signal, on line 224, and then unscrambles the compensated scrambled video signal and an audio decoder 226 that demodulates and decrypts an audio signal modulated with a three-level, partial response waveform, on line 228. An audio/video separator 30' separates the audio and video components of the television signal.

VIDEO DECODER

The video encoder 222 includes an analog-to-digital converter 32', a line tilt compensation circuit 230, a random access memory 34', a line spin transform decoder 232, an inverter 38', a pseudorandom number generator 40' and a digital timing signal generator 42'. The line-spin scrambled video signal on line 224, which includes a color burst signal and horizontal and vertical synchronization signals, is digitized by the analog-to-digital converter 32' at a sampling rate of 14.32 MHz. Line tilt compensation is then applied to the digitized scrambled video signal, on line 234, in a line tilt compensation circuit 230. The compensated scrambled video signal is stored, one horizontal line of scrambled video at a time, in the random access memory 34'. The stored samples of each video line are read from the random access memory 34' in a sequence and inverted in the inverter 38' according to the particular reverse, inverse and line spin scrambling transforms that were applied to the video line in the video encoder 22. The pseudorandom number generator 40' provides the same line spin scrambling breakpoint that was applied to the video line in the video encoder 22. The line spin transform decoder 232 controls the application of the unscrambling, reverse and inverse transforms by the memory 34' and the inverter 38'.

The unscrambled video signal output by the inverter 38' is converted into an analog video signal, on line 236, by a digital-to-analog converter 50'. The digital timing signal generator 42' synchronizes the sampling rate of the analog-to-digital converter 32' with the color burst signal in the digitized scrambled video signal, on line 234. The digital timing signal generator 42' also generates, as in the video encoder 22, a horizontal sample count signal on line 112', a reference horizontal synch signal on line 116', a vertical sample count signal on line 120' and a reference vertical synch signal on line 124'.

If a video line or video line segment was reversed in the video encoder 22, the video line is decoded in the video decoder 222 by again applying the reverse transform to the video line or segment. This second reverse transform is applied, as in the video encoder 22, by reading the reversed video line or segment from the random access memory 34' in reverse order. If a video line was line-spin scrambled in the video encoder 22, the video signal is unscrambled in the video decoder 222 by again interchanging the order that the two scrambled segments are read from the memory 34'. If a video line or video line segment was inverted in the video encoder 22, the video signal is decoded in the video decoder 222 by again applying the inverse transform to the video line or segment in the inverter 38'. This second inverse transform is applied, as in the video encoder 22, by subtracting the amplitude of a stored sample from the sample's maximum amplitude of 100 IRE.

The line spin transform decoder 232 applies the reverse and unscrambling transforms to each video line or video line segment by sending the appropriate address information to the random access memory 34', on line 238. The line spin transform decoder 232 applies the inverse transform to each video line or video line segment by engaging the inverter 38' with an invert signal, on line 240. The line spin transform decoder 232 applies the particular transforms that are designated by the transform identifier, which was encrypted and inserted into the horizontal blanking interval in the video encoder 22. This transform identifier is removed from the horizontal blanking interval of the scrambled video signal on line 234 and decrypted by decryptor 242. The pseudorandom number generator seed value, which synchronizes the pseudorandom number generator 40' with the pseudorandom number generator 40 in the video encoder 22, is also removed from the horizontal blanking interval and decrypted in decryptor 242.

The line spin transform decoder 232 applies the unscrambling transform to a scrambled video line as shown in FIG. 6. The line spin transform decoder 232 first addresses the random access memory 34' with the sequence of integers from 0 and 160 in order to read the horizontal blanking interval from memory 34'. The line spin transform decoder 232 then addresses memory 34' with the sequence of integers from the sample count of 909+160 minus the spin breakpoint to the sample count of 909. This portion of the scrambled video line is segment 104. The line spin transform decoder 232 then addresses memory 34' with the sequence of integers from the sample count of 160 to the sample count of 909+160 minus the spin breakpoint. This portion of the scrambled video line is segment 102.

Line Tilt Compensation

In accordance with a presently preferred embodiment of the invention, the line tilt compensation circuit 230 applies line tilt compensation to the line-spin scrambled video signal on line 234 by measuring the amplitude of the line tilt present in the scrambled video signal and then summing a complementary ramp based on the measured amplitude with each line of the scrambled video signal prior to unscrambling. The amplitude of the line tilt is measured by inserting a dummy video line having a constant-amplitude active portion, preferably in the gray region of the luminance scale, into the video signal at the video encoder 22. Then, after transmission, a measurement is made of the difference in the amplitude at the beginning and the amplitude at the end of the active portion of the dummy video line. This line tilt compensation is described in detail in the parent application of the present application entitled "Line Tilt Compensation Method and Apparatus," Ser. No. 773,488, filed on Sept. 9, 1985, which is attached as Appendix D to this application and is incorporated herein by reference.

Figure 13A:
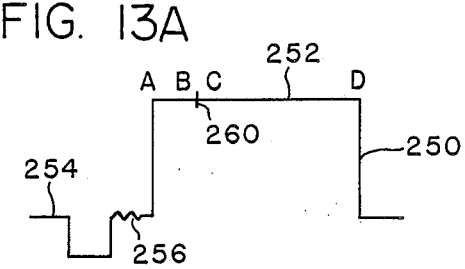
FIGS. 13A–13F are voltage-time graphs of a video line before and after line spin scrambling and after transmission, line tilt compensation and unscrambling.
Figure 13C:
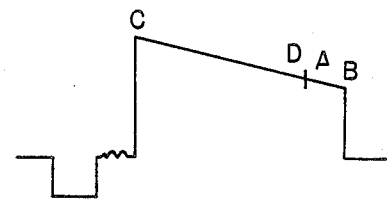
Figure 13E:
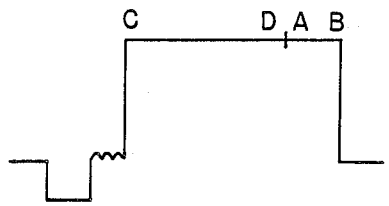
Figure 13B:
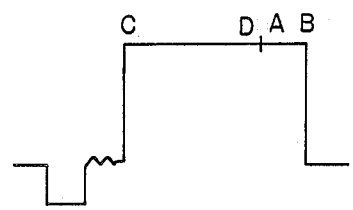
Figure 13D:
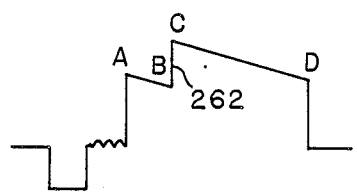
Figure 13F:
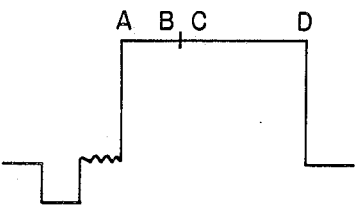

FIGS. 13A through 13F illustrate the voltage-time graphs of a video line before and after line spin scrambling and after transmission, line tilt compensation and unscrambling. FIG. 13A illustrates a video line 250 having a constant-amplitude active portion 252, the active portion being the segment between points A and D. Also shown is a horizontal blanking interval 254, which includes an eight-cycle color burst 256 and a horizontal synchronization signal 258. FIG. 13B illustrates the video line 250 after line-spin scrambling about a spin breakpoint 260. The line-spin scrambled video line is then transmitted, which corrupts the active portion of the scrambled video line with line tilt, as shown in FIG. 13C. If the corrupted video line is unscrambled without compensation for line tilt, a video line having a luminance discontinuity 262 results, as shown in FIG. 13D. Because of the random nature of the discontinuity across the active portion of each video line, the result is a chaotic hashing of luminance striations in the received picture. However, if line tilt compensation is applied in the line tilt compensation circuit 230, a video line as shown in FIG. 13E results. After unscrambling, the original video line is reproduced, as shown in FIG. 13F.

FIG. 14 illustrates a detailed diagram of the line tilt compensation circuit 230, including, in series, a dummy video line selector 260, a line tilt amplitude detector 262, a low-pass filter 264, and a ramp generator 266. The dummy video line selector 260 selects the dummy video line from the scrambled digitized video signal on line 234 for measurement. The line tilt amplitude detector 262 measures the amplitude of the line tilt and the low-pass filter 264 filters any noise from the measurement. The ramp generator 266 generates a linear complementary ramp based on the measured amplitude, which is summed with the digitized scrambled video line on line 234 at a summer 268.

The line tilt amplitude detector 262 measures the amplitude of the line tilt by accumulating the differences in amplitude between adjacent points sampled across the active portion of the dummy video line. These amplitude differentials are measured in a differencing circuit 270, which includes a flip flop 272 and a summer 274. The flip flop 272 outputs a one clock-pulse delayed amplitude sample of the dummy video line, which is summed with a negative of the present amplitude sample of the dummy video line at the summer 274. The flip flop 272 is clocked by a ramp clock signal, on line 276, which in the presently preferred embodiment, is a clock signal having 44 pulses across the active portion of the dummy video line. Therefore, 44 amplitude differentials are computed for each dummy video line.

The 44 amplitude differentials output by the differencing circuit 270 are accumulated, or integrated, in an accumulator 278. The accumulator 278 includes a flip flop 280, which is also clocked by the ramp clock signal on line 276. The accumulation is performed by summing the output of the flip flop 280 at a summer 282 with the amplitude differential output by the differencing circuit 270. After the 44 amplitude differentials have been summed, the output of the accumulator 278 provides the measured value of the line tilt amplitude (R). A begin dummy line signal, on line 284, clears the accumulator 278 when a new dummy video line is selected.

The line tilt amplitude (R) measurement output by the accumulator 278 is scaled in a scale circuit 286 by the negative of the number of samples used to measure the line tilt amplitude. This scaling produces a negative line tilt amplitude slope, which is latched into a flip flop 288 by an end dummy line signal, on line 290, and then filtered with the low-pass filter 264. The line tilt amplitude slope output by the low-pass filter 264 is applied to the ramp generator 266 to generate the linear complementary ramp. The ramp generator includes a flip flop 292, which is also clocked by the ramp clock signal on line 276, and a summer 294. The ramp generator 66 is identical in function to the accumulator 278 and generates the complement of the filtered output of the accumulator 278. The linear complementary ramp is then summed, sample by sample, with the corresponding sample of the digitized scrambled video signal at the summer 268. The flip flop 292 is cleared by a horizontal blanking interval signal, on line 296, so that the ramp is summed only with the active portion of the line-spin scrambled video signal.

The dummy video line can be removed from the line-spin scrambled video signal and replaced with the previous video line for display on a television monitor. However, this is not necessary since the dummy video line can be transmitted at the bottom of each video field and, therefore, would not be visible on a television monitor. The operation of the line tilt compensation circuit 230 is described in greater detail in the above-referenced parent application of the present application entitled "Line Tilt Compensation Method and Apparatus."

AUDIO DECODER

The audio decoder 226 demodulates and decrypts the partial-response modulated audio signal on line 228. In the presently preferred embodiment of the invention, the audio signal is a modulated stereo audio signal. This demodulation and decryption of the modulated stereo audio signal is described in detail in the above-referenced parent application of the present application entitled "Transmission and Reception of Television Broadcasts in High-Fidelity Stereo Audio,"

As illustrated in FIG. 15, the audio decoder 226 includes, in series, a staggered quadrature partial response (SQPR) demodulator 300 that digitizes and demodulates the partial-response modulated stereo audio signal on line 228, a randomizer 302 that removes the randomization applied to the stereo audio signal by the randomizer 168 in the audio encoder 26, a serial-to-parallel converter 304 that removes the 30 bit data channel from the stereo audio signal, and an error correction decoder 306 that corrects errors introduced into the error-encoded audio signal during transmission and reception.

The audio decoder 226 also includes, in series, a burst deformatter 308 that removes the burst format applied to the stereo audio signal by the burst formatter 164 in the audio encoder 26, a decryptor 310 that decrypts the encrypted audio signal using the same pseudorandom number generator seed value on line 54' as used by the encryptor 162, a parallel-to-serial converter 312 that separates the left and right channels of the stereo audio signal, and a pair of digital-to-analog converters 314, 316 that convert the digitized stereo audio signals into analog signals for output to a pair of speakers.

Figure 16:
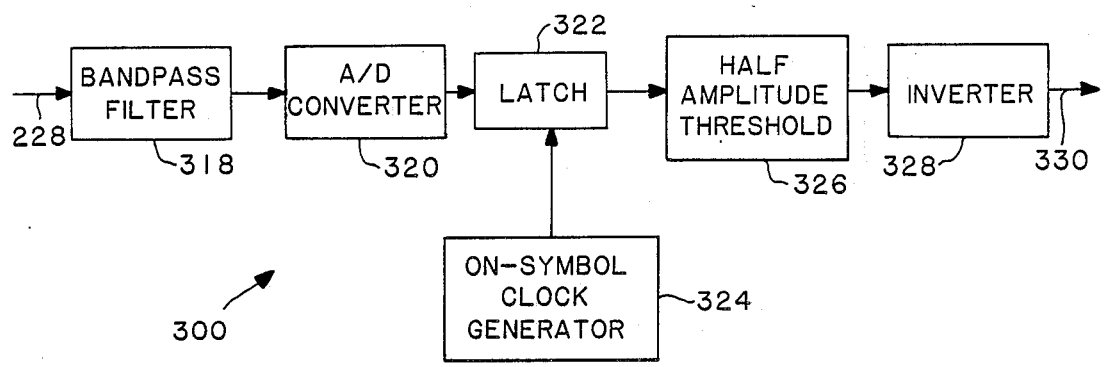
FIG. 16 is a block diagram of the SQPR demodulator.

The SQPR demodulator 300, illustrated in detail in FIG. 16, includes a 6.6 MHz bandpass filter 318 and an analog-to-digital converter 320. The bandpass filter 318 removes the conventional stereo audio channels from the audio signal on line 228. The analog-to-digital converter 320, operating at 26.4 MHz, digitizes the three-level, partial-response modulated stereo audio signal. The stereo audio data is recovered through an RF sampling of the digitized stereo audio signal output by the analog-to-digital converter 320. RF sampling is a data recovery method by which the audio data can recovered directly from the 6.6 MHz quadrature subcarrier frequency signal, without first down-converting the audio signal from the subcarrier frequency. The stereo audio data is recovered with a latch 322, an on-symbol clock generator 324 that clocks the latch 322, a half amplitude threshold detector 326 and an inverter 328.

The on-symbol clock signal generated by the on-symbol clock generator 324 is a 1.6 MHz clock signal having every other clock pulse delayed by 1/26.4 MHz. Clocking the latch 322 with this clock signal causes the latch 322 to output the on-symbol I and Q audio samples from the digitized stereo audio signal output by the analog-to-digital converter 320. The on-symbol I and Q audio samples contain the original stereo audio information. The original stereo audio information is recovered from the on-symbol I and Q audio samples by the half amplitude threshold detector 326 and the inverter 328.

The half amplitude threshold detector 326 has a threshold set at $\pm\frac{1}{2}$ of the peak on-symbol amplitude. The threshold detector 326 outputs a one if the on-symbol audio sample has an amplitude that exceeds the plus or minus threshold and outputs a zero if the on-symbol audio sample has an amplitude that does not exceed the threshold. The output of the threshold detector 326 is then inverted by the inverter 328. The output of the inverter 328, on line 330, is the original random serial bit stream of data and encrypted and error-encoded audio samples. The output of the inverter 328 on line 330 is applied to the randomizer 302, as shown in FIG. 15.

The original serial bit stream of audio samples is recovered from the on-symbol I and Q audio samples, with only a simple threshold detector, because of the nature of the differential encoding applied to the symbol stream by the flip-flops 180, 182 and the partial response modulation. It will be recalled that the flip-flops 180, 182 toggle or change state if their input is a one and do not toggle or change state if their input is a zero. The nature of the partial response modulation is that if a state change does occur between two symbols, the amplitude of the on-symbol audio sample will be approximately zero. Therefore, when the threshold is not exceeded, a symbol having a value of one was transmitted. If a state change does not occur between two symbols, the amplitude of the on-symbol audio sample will exceed the half amplitude threshold. Therefore, when the threshold is exceeded, a symbol having a value of zero was transmitted. After inversion, these are the original symbol values.

For ground-based transmission systems, in which the modulated stereo audio signal is inserted into the horizontal blanking interval, the 3-level, partial response modulation provides a means for reconstructing the video horizontal synchronization signal and the video color burst signal. These signals are destroyed when the modulated stereo audio signal is burst out during the horizontal blanking interval. If the modulated audio signal is burst out at a rate that is a harmonic of the color burst frequency (3.58 MHz), such as 7.16 MHz, the on-symbol clock generator 324 can recover the original 7.16 MHz clock signal. This allows the color burst signal and the horizontal synchronization signal to be easily derived. The generation of the on-symbol clock signal and the various other timing signals employed in the audio decoder 226 are described in greater detail in the above-referenced parent application of the present application entitled "Transmission and Reception of Television Broadcasts in High-Fidelity Stereo Audio."

From the foregoing, it will be appreciated that the present invention provides greatly improved transmission and reception characteristics for a line-spin scrambled video signal and a digitally-encrypted audio signal. Although several preferred embodiments of the invention have been shown and described in particular detail, including, for example, specific frequencies, data rates, threshold values and quantization levels, it is to be understood that these particular values are merely presented by way of example and should not limit the scope of the invention. It will also be apparent that other adaptations and modifications can be made without departing from the spirit and scope of the invention. Accordingly, the invention is not to be limited, except as by the following claims.

We claim:

1. A television signal encoding apparatus, comprising:

a video encoder for generating a line-spin scrambled video signal having minimized amplitude gaps, a line-spin scrambled video signal being generated by dividing the active portion of each line of a video signal into at least two segments and then interchanging the segments, an amplitude gap being formed between each of the interchanged segments, the video encoder including:

an analog-to-digital converter for digitizing a video signal; and means for selectively applying a line spin scrambling transform to each line of the digitized video signal, the line spin scrambling transform being applied to a line of the digitized video signal only if the amplitude gap between each of the interchanged segments is less than or equal to a preselected value, the preselected value being less than 100 IRE units; and an audio encoder for generating a digitally-encrypted audio signal capable of being transmitted within the bandwidth limitations of a conventional television transmission system, the audio encoder including:

an analog-to-digital converter for digitizing an audio signal;

means for encrypting the digitized audio signal; and a three-level, partial response modulator for modulating the encrypted audio signal with a three-level, partial response waveform.

2. The television signal encoding apparatus as set forth in claim 1, wherein the means for selectively applying a line spin transform further includes:

means for selectively applying a line spin scrambling transform to each line of the digitized video signal and a reverse transform to a segment of the scrambled video line, the line spin scrambling and reverse transforms being applied to a line of the digitized video signal only if the amplitude gap between each of the interchanged and reversed segments is less than or equal to the preselected value;

means for selectively applying a line spin scrambling transform to each line of the digitized video signal, an inverse transform to a segment of the scrambled video line, and a reverse transform to another segment of the scrambled video line, the line spin scrambling, reverse and inverse transforms being applied to a line of the digitized video signal only if the amplitude gap between each of the interchanged, reversed and inverted segments is less than or equal to the preselected value; and means for selectively applying a reverse transform to each line of the digitized video signal that has not been line spin scrambled.

3. The television signal encoding apparatus as set forth in claim 1, wherein the means for selectively applying a line spin scrambling transform further includes:

means for selectively applying a line spin scrambling transform to each line of the digitized video signal and an inverse transform to a segment of the line-spin scrambled video line, the line spin scrambling and inverse transforms being applied to a line of the digitized video signal only if the amplitude gap between each of the interchanged and inverted segments is less than or equal to the preselected value.

4. The television signal encoding apparatus as set forth in claim 1, wherein the audio encoder includes:

a pair of analog-to-digital converters for digitizing the left and right channels of a stereo audio signal;

means for multiplexing the left and right digitized stereo audio samples to form a serial bit stream of stereo audio samples;

means for encrypting the serial bit stream of stereo audio samples; and a three-level, partial response modulator for modulating the serial bit stream of encrypted stereo audio samples with a three-level, partial response waveform.

5. The television signal encoding apparatus as set forth in claim wherein the video encoder further includes means for accurately synchronizing digital timing signals with the digitized video signal, the synchronizing means including:

means for generating a controllable master sampling clock signal;

means for generating a color-burst-frequency signal from the master sampling clock signal, the generating means including a counter driven by the master sampling clock signal;

a phase error detector for measuring the phase error between the color-burst-frequency signal and a color burst signal in the digitized video signal; and means for controlling the frequency of the master sampling clock signal with the measured phase error;

wherein the video signal is digitized at a sampling rate controlled by the master sampling clock signal, thereby synchronizing the master sampling clock signal with the video color burst signal.

6. The television signal encoding apparatus as set forth in claim 5, wherein the synchronizing means further includes:

a horizontal synch signal separator for separating a horizontal synch signal from the digitized video signal;

means for generating a reference horizontal synch signal;

a phase error detector for measuring the phase error between the video horizontal synch signal and the reference horizontal synch signal; and a horizontal counter clocked by the master sampling clock signal, the horizontal counter being loaded with the phase error measured between the horizontal synch signals, thereby synchronizing the horizontal counter with the video horizontal synch signal.

7. The television signal encoding apparatus as set forth in claim 6, wherein the means for generating a reference horizontal synch signal includes:

memory means programmed with a horizontal synch signal, the horizontal synch signal being read from the memory means when addressed by the horizontal counter, thereby generating a reference horizontal synch signal that is synchronized with the video horizontal synch signal.

8. The television signal encoding apparatus as set forth in claim 6, wherein the phase error detector for measuring the phase error between the horizontal synch signals includes:

means for measuring the number of sampling clock pulses between the video horizontal synch signal and the reference horizontal synch signal.

9. The television signal encoding apparatus as set forth in claim 6, wherein the synchronizing means further includes:

a vertical synch signal separator for separating a vertical synch signal from the digitized video signal;

means for generating a reference vertical synch signal; and a vertical counter, the vertical counter being loaded with the line number of the horizontal video line having the video vertical synch signal, thereby synchronizing the vertical counter with the video vertical synch signal.

10. The television signal encoding apparatus as set forth in claim 9, wherein the means for generating a reference vertical synch signal includes:

memory means programmed with a vertical synch signal, the vertical synch signal being read from the memory means when addressed by the vertical counter, thereby generating a reference vertical synch signal that is synchronized with the video vertical synch signal.

11. The television encoding apparatus as set forth in claim 9, wherein the vertical counter is clocked at the rate that the horizontal counter is loaded with the phase error measured between the horizontal synch signals.

12. The television signal encoding apparatus as set forth in claim 4, wherein the means for encrypting the serial bit stream of audio samples further includes:

means for bursting out the serial bit stream of encrypted stereo audio samples at a higher data rate to allow for the insertion of other data into the serial bit stream;

means for encoding the serial bit stream of encrypted stereo audio samples for error correction; and means for randomizing the serial bit stream of encrypted stereo audio samples, the randomizing means including means for multiplying the serial bit stream by a pseudorandom bit stream.

13. The television signal encoding apparatus as set forth in claim 4, wherein the means for encrypting the serial bit stream of audio samples includes:

means for adding each bit of every stereo audio sample to a pseudorandom number generator seed value.

14. The television signal encoding apparatus as set forth in claim 4, wherein the modulator includes:

memory means for storing amplitude samples from a plurality of three-level, partial response waveforms, the memory means being addressed by a plurality of bits from the serial bit stream.

15. The television signal encoding apparatus as set forth in claim 14, wherein the means for encrypting the serial bit stream of stereo audio samples further includes:

means for differentially encoding each bit in the serial bit stream with a state opposite that of the immediately preceding differentially-encoded bit when the bit is a one and with a state equal that of the immediately preceding differentially-encoded bit when the bit is a zero.

16. The television signal encoding apparatus as set forth in claim 4, wherein the modulator includes:

a pair of flip-flops for converting the serial bit stream of encrypted stereo audio samples into parallel in-phase and staggered quadrature-phase symbol streams and for differentially encoding each symbol in each of the in-phase and staggered quadrature-phase symbol streams with a state opposite that of the immediately preceding differentially-encoded symbol when the symbol is a one and with a state equal that of the immediately preceding differentially-encoded symbol when the symbol is a zero;

memory means for storing amplitude samples from a plurality of three-level, partial response waveforms, the memory means being addressed by a plurality of symbols from the in-phase and the staggered quadrature-phase symbol streams; and means for multiplexing the in-phase and staggered quadrature-phase partial response amplitude samples.

17. The television signal encoding apparatus as set forth in claim 4, wherein the modulator further includes:

means for up-converting the modulated stereo audio signal to a video subcarrier frequency.

18. The television signal encoding apparatus as set forth in claim 17, wherein the means for up-converting includes:

means for digitally complementing the modulated stereo audio signal.

19. The television signal encoding apparatus as set forth in claim 4, wherein the modulator further includes:

means for multiplexing the modulated stereo audio signal into the horizontal blanking interval of the video signal.

20. A method for encoding a television signal, comprising the steps of:

generating a line-spin scrambled video signal having minimized amplitude gaps, a line-spin scrambled video signal being generated by dividing the active portion of each line of a video signal into at least two segments and then interchanging the segments, an amplitude gap being formed between each of the interchanged segments, the step of generating including the steps of:

digitizing a video signal; and selectively applying a line spin scrambling transform to each line of the digitized video signal, the line spin scrambling transform being applied to a line of the digitized video signal only if the amplitude gap between each of the interchanged segments is less than or equal to a preselected value, the preselected value being less than 100 IRE units; and generating a digitally encrypted audio signal capable of being transmitted within the bandwidth limitations of a conventional television transmission system, the step of generating including the steps of:

digitizing an audio signal;

encrypting the digitized audio signal; and modulating the encrypted audio signal with a three-level, partial response waveform.

21. The encoding method as set forth in claim 20, wherein the step of selectively applying a line spin scrambling transform further includes the step of:

selectively applying a reverse transform to each line of the digitized video signal that has not been line spin scrambled, the reverse transform being applied to a line of the digitized video signal only if the previous line was not reversed.

22. The encoding method as set forth in claim 20, wherein the step of selectively applying a line spin scrambling transform further includes the step of:

selectively applying a line spin scrambling transform to each line of the digitized video signal and a reverse transform to a segment of the scrambled video line, the line spin scrambling and reverse transforms being applied to a line of the digitized video signal only if the amplitude gap between each of the interchanged and reversed segments is less than or equal to the preselected value, and if the amplitude at the beginning and the amplitude at the end of the active portion of the video line prior to line spin scrambling are both greater than or less than a reference value, and if the video line has not previously been line spin scrambled.

23. The encoding method as set forth in claim 22, wherein the step of selectively applying a line spin scrambling transform further includes the step of:

selectively applying a line spin scrambling transform to each line of the digitized video signal, an inverse transform to a segment of the scrambled video line, and a reverse transform to another segment of the scrambled video, the line spin scrambling, reverse and inverse transforms being applied to a line of the digitized video signal only if the amplitude gap between each of the interchanged, reversed and inverted segments is less than or equal to the preselected value and if the video line has not previously been line spin scrambled.

24. The encoding method as set forth in claim 23, wherein the step of selectively applying a line spin scrambling transform further includes the step of:

selectively applying a reverse transform to each line of the digitized video signal that has not been line spin scrambled, the reverse transform being applied to a line of the digitized video signal only if the previous line was not reversed.

25. The encoding method as set forth in claim 20, wherein the step of selectively applying a line spin scrambling transform includes the steps of:

applying a line spin scrambling transform to each line of the digitized video signal; and selectively applying an inverse transform to a segment of each line-spin scrambled video line, the inverse transform being applied to a line-spin scrambled video line only if the amplitude gap between each of the interchanged and inverted segments is less than or equal to 50 IRE units.

26. The encoding method as set forth in claim 20, wherein the step of generating a digitally encrypted audio signal includes the steps of:

digitizing the left and right channels of a stereo audio signal;

multiplexing the left and right digitized audio samples to form a serial bit stream of stereo audio samples;

encrypting the serial bit stream of stereo audio samples; and modulating the serial bit stream of encrypted stereo audio samples with a three-level, partial response waveform to form a modulated stereo audio signal.

27. The encoding method as set forth in claim 20, wherein the step of generating a line-spin scrambled video signal further includes the step of accurately synchronizing digital timing signals with the digitized video signal, the step of synchronizing including the steps of:

generating a controllable master sampling clock signal;

generating a color-burst-frequency signal from the master sampling clock signal by driving a counter with the master sampling clock signal;

measuring the phase error between the color-burst-frequency signal and a color burst signal in the digitized video signal; and controlling the frequency of the master sampling clock signal with the measured phase error;

wherein the video signal is digitized at a sampling rate controlled by the master sampling clock signal, thereby synchronizing the master sampling clock signal with the video color burst signal.

28. The encoding method as set forth in claim 27, wherein the step of synchronizing further includes the steps of:

separating a horizontal synch signal from the digitized video signal;

generating a reference horizontal synch signal;

measuring the phase error between the video horizontal synch signal and the reference horizontal synch signal; and loading a horizontal counter clocked by the master sampling clock signal with the phase error measured between the horizontal synch signals, thereby synchronizing the horizontal counter with the video horizontal synch signal.

29. The encoding method as set forth in claim 28, wherein the step of generating a reference horizontal synch signal includes the step of reading a horizontal synch signal from memory when addressed by the horizontal counter, thereby generating a reference horizontal synch signal that is synchronized with the video horizontal synch signal.

30. The encoding method as set forth in claim 28, wherein the step of measuring the phase error between the horizontal synch signals includes the step of measuring the number of sampling clock pulses between the video horizontal synch signal and the reference horizontal synch signal.

31. The encoding method as set forth in claim 28, wherein the step of synchronizing further includes the steps of:

separating a vertical synch signal from the digitized video signal;

generating a reference vertical synch signal; and loading a vertical counter with the line number of the horizontal video line having the vertical synch signal, thereby synchronizing the vertical counter with the video vertical synch signal.

32. The encoding method as set forth in claim 31, wherein the step of generating a reference vertical synch signal includes the step of:

reading a vertical synch signal from memory when addressed by the vertical counter, thereby generating a reference vertical synch signal that is synchronized with the video vertical synch signal.

33. The encoding method as set forth in claim 31, wherein the step of loading a vertical counter includes the step of clocking the vertical counter at the rate that the horizontal counter is loaded with the phase error measured between the horizontal synch signals.

34. The encoding method as set forth in claim 26, wherein the step of encrypting the serial bit stream includes the steps of:

bursting out the serial bit stream of encrypted stereo audio samples at a higher data rate to allow for the insertion of other data into the serial bit stream;

encoding the serial bit stream of encrypted stereo audio samples for error correction; and randomizing the serial bit stream of encrypted stereo audio samples by multiplying the serial bit stream by a pseudorandom bit stream.

35. The encoding method as set forth in claim 26, wherein the step of encrypting the serial bit stream includes the step of:
adding each bit of every stereo audio sample to a pseudorandom number generator seed value.

36. The encoding method as set forth in claim 26, wherein the step of modulating the serial bit stream includes the steps of:
addressing memory locations with a plurality of bits from the serial bit stream; and
reading from the memory locations amplitude samples from a plurality of three-level, partial response waveforms.

37. The encoding method as set forth in claim 36, wherein the step of encrypting the serial bit stream includes the step of:
differentially encoding each bit in the serial bit stream with a state opposite that of the immediately preceding differentially-encoded bit when the bit is a one and with a state equal that of the immediately preceding differentially-encoded bit when the bit is a zero.

38. The encoding method as set forth in claim 26, wherein the step of modulating the serial bit stream includes the steps of:
converting the serial bit stream of encrypted stereo audio samples into parallel in-phase and staggered quadrature-phase symbol streams;
addressing memory locations with a plurality of the symbols from the in-phase and the staggered quadrature-phase symbol streams;
reading from the memory locations amplitude samples from a plurality of three-level, partial response waveforms; and
multiplexing the in-phase and staggered quadrature-phase amplitude samples.

39. The encoding method as set forth in claim 38, wherein the step of converting the serial bit stream includes the step of:
differentially encoding each symbol in each of the in-phase and staggered quadrature-phase symbol streams with a state opposite that of the immediately preceding differentially-encoded symbol when the symbol is a one and with a state equal that of the immediately preceding differentially-encoded symbol when the symbol is a zero.

40. The encoding method as set forth in claim 26, wherein the step of modulating the serial bit stream further includes the step of:
up-converting the modulated stereo audio signal to a video subcarrier frequency.

41. The encoding method as set forth in claim 40, wherein the step of up-converting the modulated stereo audio signal includes the step of:
digitally complementing the modulated stereo audio signal.

42. The encoding method as set forth in claim 26, wherein the step of modulating the serial bit stream further includes the step of:
multiplexing the modulated stereo audio signal into the horizontal blanking interval of the video signal.

43. A television signal decoding apparatus, comprising
a video decoder that applies line tilt compensation to a line-spin scrambled video signal, the video decoder including
an analog-to-digital converter for digitizing the line-spin scrambled video signal;
means for measuring the amplitude of the line tilt in the digitized scrambled video signal;
means for generating a complementary ramp based on the measured amplitude; and
means for summing the complementary ramp with each line of the digitized scrambled video signal; and
an audio decoder that recovers an audio signal modulated with a three-level, partial response waveform, the audio decoder including:
an analog-to-digital converter for digitizing the modulated audio signal;
a three-level, partial response demodulator for recovering a serial bit stream of audio samples from the digitized audio signal; and
means for decrypting the serial bit stream of audio samples.

44. The television decoding apparatus as set forth in claim 43, and further including means for applying an unscrambling transform to each line-spin scrambled line of the compensated scrambled video signal, the means for applying an unscrambling transform including:
means for applying a reverse transform to each reversed video segment or reversed video line of the compensated scrambled video signal; and
means for applying an inverse transform to each inverted video segment or inverted video line of the compensated scrambled video signal.

45. The television decoding apparatus as set forth in claim 43, wherein the means for measuring the line tilt amplitude includes:
means for measuring the amplitude differential between the ends of the active portion of a dummy video line transmitted with a constant-amplitude active portion.

46. The television decoding apparatus as set forth in claim 45, wherein the means for measuring the line tilt amplitude further includes:
means for replacing the dummy video line with a previous video line for display of the unscrambled video signal on a television monitor.

47. The television decoding apparatus as set forth in claim 45, wherein the dummy video line is transmitted at the bottom of each video field with a constant-amplitude active portion in the gray region of the luminance scale.

48. The television decoding apparatus as set forth in claim 45, wherein the means for measuring the amplitude differential includes:
means for measuring the amplitude differential between adjacent points sampled across the active portion of the dummy video line; and
means for accumulating the amplitude differentials.

49. The television decoding apparatus as set forth in claim 43, wherein the audio decoder includes:
an analog-to-digital converter for digitizing a modulated stereo audio signal;
a three-level, partial response demodulator for recovering a serial bit stream of stereo audio samples from the digitized stereo audio signal; and
means for decrypting the serial bit stream of stereo audio samples.

50. The television decoding apparatus as set forth in claim 43, wherein the video decoder further includes means for accurately synchronizing digital timing signals with the digitized scrambled video signal, the synchronizing means including:

means for generating a controllable master sampling clock signal;

means for generating a color-burst-frequency signal from the master sampling clock signal, the generating means including a counter driven by the master sampling clock signal;

a phase error detector for measuring the phase error between the color-burst-frequency signal and a color burst signal in the digitized scrambled video signal; and means for controlling the frequency of the master sampling clock signal with the measured phase error;

wherein the line-spin scrambled video signal is digitized at a sampling rate controlled by the master sampling clock signal, thereby synchronizing the master sampling clock signal with the video color burst signal.

51. The television decoding apparatus as set forth in claim 50, wherein the synchronizing means further includes:

a horizontal synch signal separator for separating a horizontal synch signal from the digitized scrambled video signal;

means for generating a reference horizontal synch signal;

a phase error detector for measuring the phase error between the video horizontal synch signal and the reference horizontal synch signal; and a horizontal counter clocked by the master sampling clock signal, the horizontal counter being loaded with the phase error measured between the horizontal synch signals, thereby synchronizing the horizontal counter with the video horizontal synch signal.

52. The television decoding apparatus as set forth in claim 51, wherein the means for generating a reference horizontal synch signal includes:

memory means programmed with a horizontal synch signal, the horizontal synch signal being read from the memory means when addressed by the horizontal counter, thereby generating a reference horizontal synch signal that is synchronized with the video horizontal synch signal.

53. The television decoding apparatus as set forth in claim 51, wherein the phase error detector for measuring the phase error between the horizontal synch signals includes:

means for measuring the number of sampling clock pulses between the video horizontal synch signal and the reference horizontal synch signal.

54. The television decoding apparatus as set forth in claim 51, wherein the synchronizing means further includes:

a vertical synch signal separator for separating a vertical synch signal from the digitized scrambled video signal;

means for generating a reference vertical synch signal; and a vertical counter, the vertical counter being loaded with the line number of the horizontal video line having the video vertical synch signal, thereby synchronizing the vertical counter with the video vertical synch signal.

55. The television decoding apparatus as set forth in claim 54, wherein the means for generating a reference vertical synch signal includes:

memory means programmed with a vertical synch signal, the vertical synch signal being read from the memory means when addressed by the vertical counter, thereby generating a reference vertical synch signal that is synchronized with the video vertical synch signal.

56. The television decoding apparatus as set forth in claim 54, wherein the vertical counter is clocked at the rate that the horizontal counter is loaded with the phase error measured between the horizontal synch signals.

57. The television decoding apparatus as set forth in claim 49, wherein the means for decrypting the serial bit stream further includes:

means for randomizing the serial bit stream of stereo audio samples to remove randomization applied to the stereo audio signal during modulation;

means for correcting the serial bit stream for errors present in the modulated stereo audio signal;

a serial-to-parallel converter for separating the left and right stereo audio samples; and a pair of digital-to-analog converters for converting the left and right stereo audio samples to analog signals.

58. The television decoding apparatus as set forth in claim 49, wherein the three-level, partial response demodulator includes:

means for recovering a stream of on-symbol audio samples from the digitized stereo audio signal; and means for converting the on-symbol audio samples into a serial bit stream of stereo audio samples.

59. The television decoding apparatus as set forth in claim 49, wherein the three-level, partial response demodulator includes:

means for recovering a stream of alternating in-phase and staggered quadrature-phase on-symbol audio samples from the digitized stereo audio signal; and means for converting the stream of alternating in-phase and staggered quadrature-phase on-symbol audio samples into a serial bit stream of stereo audio samples.

60. The television decoding apparatus as set forth in claim 58, wherein the means for recovering includes:

means for generating an on-symbol clock signal; and a latch clocked by the on-symbol clock signal.

61. The television decoding apparatus as set forth in claim 59, wherein the means for recovering includes:

means for generating an on-symbol clock signal; and a latch clocked by the on-symbol clock signal.

62. The television decoding apparatus as set forth in claim 58, wherein the means for converting includes:

a half amplitude threshold detector; and an inverter.

63. The television decoding apparatus as set forth in claim 59, wherein the means for converting includes:

a half amplitude threshold detector; and an inverter.

64. The television decoding apparatus as set forth in claim 60, wherein the on-symbol clock signal can be used to derive a video color burst signal and a video horizontal synch signal.

65. The television decoding apparatus as set forth in claim 61, wherein the on-symbol clock signal can be used to derive a video color burst signal and a video horizontal synch signal.

66. A method for decoding a television signal, comprising the steps of:

applying line tilt compensation to a line-spin scrambled video signal, the step of applying line tilt compensation including the steps of:
digitizing the line-spin scrambled video signal;
measuring the amplitude of the line tilt in the digitized scrambled video signal;
generating a complementary ramp based on the measured amplitude; and
summing the complementary ramp with each line of the digitized scrambled video signal; and
recovering an audio signal modulated with a three-level, partial response waveform, the step of recovering including the steps of;
digitizing the modulated audio signal;
recovering a serial bit stream of audio samples from the digitized audio signal; and
decrypting the serial bit stream of audio samples.

67. The decoding method as set forth in claim 66, and further including the step of unscrambling each line-spin scrambled video line of the compensated scrambled video signal, the step of unscrambling including the steps of:
applying a reverse transform to each reversed video segment or reversed video line of the compensated scrambled video signal; and
applying an inverse transform to each inverted video segment or inverted video line of the compensated scrambled video signal.

68. The decoding method as set forth in claim 68, wherein the step of measuring the line tilt amplitude includes the step of:
measuring the amplitude differential between the ends of the active portion of a dummy video line transmitted with a constant-amplitude active portion.

69. The decoding method as set forth in claim 68 wherein the step of measuring the line tilt amplitude further includes the step of:
replacing the dummy video line with a previous video line for display of the unscrambled video signal on a television monitor.

70. The decoding method as set forth in claim 68, wherein the dummy video line is transmitted at the bottom of each video field with a constant-amplitude active portion in the gray region of the luminance scale.

71. The decoding method as set forth in claim 68, wherein the step of measuring the amplitude differential includes the steps of:
measuring the amplitude differential between adjacent points sampled across the active portion of the dummy video line; and
accumulating the amplitude differentials.

72. The decoding method as set forth in claim 66, wherein the step of recovering a modulated audio signal includes the steps of:
digitizing a modulated stereo audio signal;
recovering a serial bit stream of stereo audio samples from the digitized stereo audio signal; and
decrypting the serial bit stream of stereo audio samples.

73. The decoding method as set forth in claim 66, and further including the step of accurately synchronizing digital timing signals with the digitized scrambled video signal, the step of synchronizing including the steps of:
generating a controllable master sampling clock signal;
generating a color-burst-frequency signal from the master sampling clock signal by driving a counter with the master sampling clock signal;
measuring the phase error between the color-burst-frequency signal and a color burst signal in the digitized scrambled video signal; and
controlling the frequency of the master sampling clock signal with the measured phase error;
wherein the line-spin scrambled video signal is digitized at a sampling rate controlled by the master sampling clock signal, thereby synchronizing the master sampling clock signal with the video color burst signal.

74. The decoding method as set forth in claim 73, wherein the step of synchronizing further includes the steps of:
separating a horizontal synch signal from the digitized scrambled video signal;
generating a reference horizontal synch signal;
measuring the phase error between the video horizontal synch signal and the reference horizontal synch signal; and
loading a horizontal counter clocked by the master sampling clock signal with the phase error measured between the horizontal synch signals, thereby synchronizing the horizontal counter with the video horizontal synch signal.

75. The decoding method as set forth in claim 74, wherein the step of generating a reference horizontal synch signal includes the step of reading a horizontal synch signal from memory when addressed by the horizontal counter, thereby generating a reference horizontal synch signal that is synchronized with the video horizontal synch signal.

76. The decoding method as set forth in claim 74, wherein the step of measuring the phase error between the horizontal synch signals includes the step of measuring the number of sampling clock pulses between the video horizontal synch signal and the reference horizontal synch signal.

77. The decoding method as set forth in claim 74, wherein the step of synchronizing further includes the steps of:
separating a vertical synch signal from the digitized scrambled video signal;
generating a reference vertical synch signal; and
loading a vertical counter with the line number of the horizontal video line having the vertical synch signal, thereby synchronizing the vertical counter with the video vertical synch signal.

78. The decoding method as set forth in claim 77, wherein the step of generating a reference vertical synch signal includes the step of:
reading a vertical synch signal from memory when addressed by the vertical counter, thereby generating a reference vertical synch signal that is synchronized with the video vertical synch signal.

79. The decoding method as set forth in claim 77, wherein the step of loading a vertical counter includes the step of clocking the vertical counter at the rate that the horizontal counter is loaded with the phase error measured between the horizontal synch signals.

80. The decoding method as set forth in claim 72, wherein the step of decrypting the serial bit stream further includes the steps of:
randomizing the serial bit stream of stereo audio samples to remove randomization applied to the stereo audio signal during modulation;

correcting the serial bit stream for errors present in the modulated stereo audio signal;

separating the left and right stereo audio samples; and converting the left and right stereo audio samples to analog signals.

81. The decoding method as set forth in claim 72, wherein the step of recovering a serial bit stream of stereo audio samples includes the steps of:

recovering a stream of on-symbol audio samples from the digitized stereo audio signal; and converting the on-symbol audio samples into a serial bit stream of stereo audio samples.

82. The decoding method as set forth in claim 72, wherein the step of recovering a serial bit stream of stereo audio samples includes the steps of:

recovering a stream of alternating in-phase and staggered quadrature-phase on-symbol audio samples from the digitized stereo audio signal; and converting the stream of alternating in-phase and staggered quadrature-phase on-symbol audio samples into a serial bit stream of stereo audio samples.

83. The decoding method as set forth in claim 81, wherein the step of recovering a stream of on-symbol audio samples includes the steps of:

generating an on-symbol clock signal; and clocking a latch with the on-symbol clock signal.

84. The decoding method as set forth in claim 82, wherein the step of recovering a stream of alternating on-symbol audio samples includes the steps of:

generating an on-symbol clock signal; and clocking a latch with the on-symbol clock signal.

85. The decoding method as set forth in claim 81, wherein the step of converting the on-symbol audio samples includes the steps of:

applying each on-symbol audio sample to a half amplitude threshold detector; and inverting the output of the threshold detector.

86. The decoding method as set forth in claim 82, wherein the step of converting the stream of alternating on-symbol audio samples includes the steps of:

applying each on-symbol audio sample to a half amplitude threshold detector; and inverting the output cf the threshold detector.

87. The decoding method as set forth in claim 83, wherein the step of generating an on-symbol clock signal includes the step of deriving a video color burst signal and a video horizontal synch signal from the on-symbol clock signal.

88. The decoding method as set forth in claim 84, wherein the step of generating an on-symbol clock signal includes the step of deriving a video color burst signal and a video horizontal synch signal from the on-symbol clock signal.

* * * * *